United States Patent
Ju et al.

(10) Patent No.: US 10,768,719 B2
(45) Date of Patent: Sep. 8, 2020

(54) TOUCH DISPLAY DEVICE, TOUCH SYSTEM, TOUCH DRIVING CIRCUIT, PEN, AND PEN SENSING METHOD

(71) Applicant: LG DISPLAY CO., LTD., Seoul (KR)

(72) Inventors: Suyun Ju, Gangwon-do (KR); HyungUk Jang, Goyang-si (KR); SangHyuck Bae, Seoul (KR); Sungsu Han, Goyang-si (KR); DoYoung Jung, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/233,537

(22) Filed: Dec. 27, 2018

(65) Prior Publication Data
US 2019/0204939 A1 Jul. 4, 2019

(30) Foreign Application Priority Data

Dec. 29, 2017 (KR) .................... 10-2017-0184149

(51) Int. Cl.
*G06F 3/01* (2006.01)
*G06F 3/041* (2006.01)
(Continued)

(52) U.S. Cl.
CPC .......... *G06F 3/03545* (2013.01); *G06F 3/017* (2013.01); *G06F 3/0416* (2013.01);
(Continued)

(58) Field of Classification Search
CPC .......... G06F 3/01; G06F 3/017; G06F 3/0346; G06F 3/0354; G06F 3/03545;
(Continued)

(56) References Cited

U.S. PATENT DOCUMENTS 4,318,096 A * 3/1982 Thornburg .......... G06F 3/03545
178/19.04
4,492,819 A * 1/1985 Rodgers .................. G06F 3/044
178/18.05
(Continued)

FOREIGN PATENT DOCUMENTS

JP 2011164801 A 8/2011
JP 2016126503 A 7/2016
(Continued)

OTHER PUBLICATIONS

Office Action dated Feb. 4, 2020 issued in corresponding Japanese Application No. 2018-242469 (6 pages).
(Continued)

*Primary Examiner* — Michael J Eurice
(74) *Attorney, Agent, or Firm* — Polsinelli PC

(57) ABSTRACT

The aspects of the present disclosure relate to a touch display device, a touch system, a touch driving circuit, a pen, and a pen sensing method, and more particularly, to a touch display device, a touch system, a touch driving circuit, a pen, and a pen sensing method, which may receive a first downlink signal and a second downlink signal output from a pen through all or some of a plurality of touch electrodes and may sense the pen based on received signal strength for each touch electrode for the first downlink signal and received signal strength for each touch electrode for the second downlink signal. According to the aspects of the present disclosure, the pen may be accurately sensed even when a user uses the pen in a tilted manner.

22 Claims, 32 Drawing Sheets

(51) Int. Cl.
*G06F 3/044* (2006.01)
*G06F 3/0354* (2013.01)
*G06F 3/0488* (2013.01)

(52) U.S. Cl.
CPC ........ *G06F 3/0442* (2019.05); *G06F 3/04162* (2019.05); *G06F 3/04166* (2019.05); *G06F 3/04883* (2013.01); *G06F 3/0412* (2013.01); *G06F 3/0443* (2019.05); *G06F 2203/04114* (2019.05)

(58) Field of Classification Search
CPC .......... G06F 3/038; G06F 3/383; G06F 3/041; G06F 3/0412; G06F 3/0416; G06F 3/04166; G06F 3/0418; G06F 3/04186; G06F 3/044; G06F 3/0442; G06F 3/0443; G06F 3/046; G06F 3/0488; G06F 3/04883; G06F 2203/04107; G06F 2203/04112; G06F 2203/04114; G06F 3/04162
See application file for complete search history.

(56) References Cited

U.S. PATENT DOCUMENTS

| | | | | |
|---|---|---|---|---|
| 4,616,106 A * | 10/1986 | Fowler | G06F 3/046 | 178/18.05 |
| 4,639,720 A * | 1/1987 | Rympalski | G06F 3/033 | 341/33 |
| 4,672,154 A * | 6/1987 | Rodgers | G06F 3/03545 | 178/19.07 |
| 4,677,428 A * | 6/1987 | Bartholow | G06F 3/0386 | 250/227.13 |
| 4,786,765 A * | 11/1988 | Yamanami | G06F 3/03545 | 178/19.06 |
| 5,120,907 A * | 6/1992 | Shinbori | G06F 3/046 | 178/18.07 |
| 5,124,509 A * | 6/1992 | Hoendervoogt | G06F 3/041 | 178/18.06 |
| 5,134,689 A * | 7/1992 | Murakami | G06F 3/046 | 345/443 |
| 5,138,118 A * | 8/1992 | Russell | G06F 3/046 | 178/19.03 |
| 5,218,174 A * | 6/1993 | Gray | G06F 3/046 | 178/19.03 |
| 5,251,123 A * | 10/1993 | Reiffel | G06F 3/0346 | 178/18.03 |
| 5,369,227 A * | 11/1994 | Stone | G06F 3/03545 | 172/19 |
| 5,528,002 A * | 6/1996 | Katabami | G06F 3/044 | 178/19.06 |
| 5,844,548 A * | 12/1998 | Chen | G06F 3/03545 | 345/179 |
| 5,905,489 A * | 5/1999 | Takahama | G06F 3/044 | 345/156 |
| 6,133,906 A * | 10/2000 | Geaghan | G06F 3/041 | 178/18.01 |
| 6,417,846 B1 * | 7/2002 | Lee | G06F 3/03545 | 178/18.01 |
| 6,441,810 B1 * | 8/2002 | Skoog | G06F 3/0383 | 345/179 |
| 7,084,860 B1 * | 8/2006 | Jaeger | G06F 3/0416 | 178/18.01 |
| 7,202,862 B1 * | 4/2007 | Palay | G06F 3/03545 | 178/18.01 |
| 7,428,990 B1 * | 9/2008 | Milford | G06K 7/081 | 235/435 |
| 7,612,767 B1 * | 11/2009 | Griffin | G06F 3/044 | 178/19.03 |
| 8,674,958 B1 * | 3/2014 | Kravets | G06F 3/044 | 345/173 |
| 8,810,263 B1 * | 8/2014 | Wilson | G01R 27/26 | 324/658 |
| 10,324,547 B2 * | 6/2019 | Han | G06F 3/0383 | |
| 2001/0055005 A1 * | 12/2001 | Teterwak | G06F 3/03545 | 345/173 |
| 2002/0034300 A1 * | 3/2002 | Thuvesholmen | H04L 9/0643 | 380/256 |
| 2002/0134594 A1 * | 9/2002 | Taylor | G06F 3/0346 | 178/18.01 |
| 2003/0095109 A1 * | 5/2003 | Sasaki | G06F 3/03542 | 345/173 |
| 2003/0098858 A1 * | 5/2003 | Perski | G06F 3/0416 | 345/173 |
| 2004/0119701 A1 * | 6/2004 | Mulligan | G06F 3/044 | 345/173 |
| 2004/0131252 A1 * | 7/2004 | Seto | G06F 3/03545 | 382/179 |
| 2005/0104870 A1 * | 5/2005 | Jurisch | G06F 3/03542 | 345/179 |
| 2005/0128191 A1 * | 6/2005 | Katsurahira | G06F 1/3203 | 345/179 |
| 2005/0248549 A1 * | 11/2005 | Dietz | G06F 3/016 | 345/179 |
| 2006/0181525 A1 * | 8/2006 | Larsen | G06F 3/03545 | 345/179 |
| 2006/0250374 A1 * | 11/2006 | Morita | G06F 3/0488 | 345/173 |
| 2007/0085836 A1 * | 4/2007 | Ely | G06F 3/03545 | 345/173 |
| 2007/0146317 A1 * | 6/2007 | Schena | G01D 7/007 | 345/156 |
| 2007/0146351 A1 * | 6/2007 | Katsurahira | G06F 3/03545 | 345/179 |
| 2007/0177533 A1 * | 8/2007 | Palay | G06F 3/03545 | 370/295 |
| 2007/0227785 A1 * | 10/2007 | Katsurahira | G06F 3/046 | 178/18.07 |
| 2007/0262966 A1 * | 11/2007 | Nishimura | G06F 3/044 | 345/173 |
| 2007/0287386 A1 * | 12/2007 | Agrawal | H04W 4/029 | 455/67.11 |
| 2008/0099254 A1 * | 5/2008 | Katsurahira | G06F 3/03545 | 178/18.01 |
| 2008/0150916 A1 * | 6/2008 | Vos | G06F 3/03545 | 345/179 |
| 2008/0156546 A1 * | 7/2008 | Hauck | G06F 3/03545 | 178/19.01 |
| 2008/0158165 A1 * | 7/2008 | Geaghan | G06F 3/03545 | 345/173 |
| 2008/0165163 A1 * | 7/2008 | Bathiche | G06F 3/0317 | 345/179 |
| 2008/0192007 A1 * | 8/2008 | Wilson | G06F 3/038 | 345/158 |
| 2008/0198131 A1 * | 8/2008 | Rondot | A63F 13/06 | 345/158 |
| 2009/0219262 A1 * | 9/2009 | Champion | G06F 3/03542 | 345/179 |
| 2009/0278794 A1 * | 11/2009 | McReynolds | G06F 3/0421 | 345/156 |
| 2010/0170726 A1 * | 7/2010 | Yeh | G06F 3/03545 | 178/19.03 |
| 2010/0315384 A1 * | 12/2010 | Hargreaves | G06F 3/03545 | 345/179 |
| 2011/0061948 A1 * | 3/2011 | Krah | G06F 3/0418 | 178/18.01 |
| 2012/0013555 A1 * | 1/2012 | Maeda | G06F 3/03545 | 345/173 |
| 2012/0068964 A1 * | 3/2012 | Wright | G06F 3/03545 | 345/174 |
| 2012/0105362 A1 * | 5/2012 | Kremin | G06F 3/03545 | 345/174 |
| 2012/0268414 A1 * | 10/2012 | Alameh | G06F 3/03545 | 345/174 |
| 2012/0280947 A1 * | 11/2012 | Weaver | G06F 3/03545 | 345/179 |
| 2013/0207938 A1 * | 8/2013 | Ryshtun | G06F 3/0416 | 345/179 |

(56) References Cited

U.S. PATENT DOCUMENTS

| | | | |
|---|---|---|---|
| 2014/0104186 A1* | 4/2014 | Bakken | G06F 3/044 345/173 |
| 2014/0104187 A1* | 4/2014 | Bakken | G06F 3/044 345/173 |
| 2014/0104188 A1* | 4/2014 | Bakken | G06F 3/044 345/173 |
| 2014/0152582 A1* | 6/2014 | Agarwal | G06F 3/0418 345/173 |
| 2014/0240298 A1* | 8/2014 | Stern | G06F 3/0383 345/179 |
| 2014/0267192 A1* | 9/2014 | Matsuura | G06F 3/03546 345/179 |
| 2015/0002421 A1* | 1/2015 | Kim | G06F 3/041 345/173 |
| 2015/0084899 A1* | 3/2015 | Park | G06F 3/03545 345/173 |
| 2015/0091856 A1* | 4/2015 | Park | G06F 3/0416 345/174 |
| 2015/0091859 A1* | 4/2015 | Rosenberg | G06F 3/044 345/174 |
| 2015/0103039 A1* | 4/2015 | Cho | G06F 3/044 345/174 |
| 2015/0242043 A1* | 8/2015 | Oda | G06F 3/044 345/174 |
| 2016/0062492 A1 | 3/2016 | Geller et al. | |
| 2016/0116997 A1* | 4/2016 | Kim | G06F 3/03545 345/174 |
| 2016/0179242 A1* | 6/2016 | Shepelev | G06F 3/044 345/174 |
| 2016/0179249 A1* | 6/2016 | Ballan | G06F 3/0416 345/174 |
| 2016/0209957 A1* | 7/2016 | Jung | G06F 3/044 |
| 2016/0252981 A1* | 9/2016 | Chang | G06F 3/0383 345/179 |
| 2016/0370915 A1* | 12/2016 | Agarwal | G06F 3/0416 |
| 2016/0378208 A1* | 12/2016 | Shahparnia | G06F 3/03545 345/173 |
| 2017/0147140 A1* | 5/2017 | Kosugi | G06F 1/163 |
| 2017/0168593 A1* | 6/2017 | Kwak | G06F 1/1669 |
| 2017/0192549 A1* | 7/2017 | Katayama | G06F 3/041 |
| 2017/0242502 A1* | 8/2017 | Gray | G06F 3/0383 |
| 2017/0249028 A1* | 8/2017 | Marshall | G06F 3/03545 |
| 2017/0300138 A1* | 10/2017 | Qian | G06F 3/044 |
| 2017/0357338 A1 | 12/2017 | Bell | |
| 2017/0357367 A1* | 12/2017 | Katsuta | G06F 3/046 |
| 2017/0357368 A1* | 12/2017 | Katsuta | G06F 3/0416 |
| 2018/0052548 A1* | 2/2018 | Katsuta | G02F 1/13338 |
| 2018/0059461 A1* | 3/2018 | Katsuta | G02F 1/13338 |
| 2018/0129316 A1* | 5/2018 | Kremin | G06F 3/044 |
| 2018/0143703 A1* | 5/2018 | Fleck | G06F 3/0346 |
| 2019/0018544 A1* | 1/2019 | Rosenberg | G06F 3/044 |
| 2019/0163320 A1* | 5/2019 | Park | G06F 3/03545 |

FOREIGN PATENT DOCUMENTS

| | | |
|---|---|---|
| JP | 2016153954 A | 8/2016 |
| JP | 2017111687 A | 6/2017 |
| TW | 201721373 A | 6/2017 |
| TW | 201810005 A | 3/2018 |
| WO | 2017044311 A | 3/2017 |

OTHER PUBLICATIONS

Office Action dated Nov. 4, 2019 issued in corresponding Taiwanese Patent Application No. 107147692.

* cited by examiner

TOUCH DISPLAY DEVICE, TOUCH SYSTEM, TOUCH DRIVING CIRCUIT, PEN, AND PEN SENSING METHOD

CROSS REFERENCE TO RELATED APPLICATION

This application claims priority from Korean Patent Application No. 10-2017-0184149, filed on Dec. 29, 2017, which is hereby incorporated by reference in its entirety for all purposes as if fully set forth herein.

BACKGROUND

Field of the Disclosure

The present disclosure relates to a touch display device, a touch system, a touch driving circuit, a pen, and a pen sensing method.

Description of the Background

With the development of the information society, demand for a touch display device in various forms for displaying an image have increased. Recently, various display devices such as a liquid crystal display device, a plasma display device, and an organic light emitting display device have been commercialized.

Such a display device provides a touch-based input method that allows a user to easily input information or commands in an intuitive and convenient manner, without using a conventional input method such as a button, a keyboard, and a mouse.

In order to provide such a touch-based input method, it is necessary to determine the presence or absence of a user's touch and accurately detect touch coordinates thereof.

In addition to a finger or the like, pen touch technology has also been developed in response to increased demands for sophisticated pen touch inputs.

In such a conventional pen touch technology, when a user uses a pen vertically, there is no big problem. However, when the user uses the pen in a tilted manner, the position of the pen may be sensed at a position different from the actual position of the pen.

In this case, an erroneous operation can be performed, such that an operation relevant to the corresponding pen touch input cannot be performed or an operation irrelevant thereto is performed, or a touch-related indication may be made at a point different from a point where the user touches (writes) using the pen. This phenomenon can be worse depending on whether the user is right-handed or left-handed.

SUMMARY

In this background, an aspect of the present disclosure is to accurately sense a pen even when a user uses the pen in a tilted manner.

Another aspect of the present disclosure is to provide a pen having two signal transmission media (e.g., a tip and a ring) and to more accurately sense a pen tilt through such a pen.

Still another aspect of the present disclosure is to sense accurate pen coordinates by correcting a coordinate error due to a pen tilt.

Yet another aspect of the present disclosure is to efficiently sense a pen by driving two signal transmission media (e.g., a tip and a ring) of the pen in a time-division manner.

A further aspect of the present disclosure is to rapidly sense a pen by simultaneously driving two signal transmission media (e.g, a tip and a ring) of the pen.

In accordance with an aspect of the present disclosure, there is provided a touch display device including: a touch panel configured to include a plurality of touch electrodes; and a touch circuit configured to receive a first downlink signal and a second downlink signal output from a pen through all or some of the plurality of touch electrodes and to detect pen coordinates or a pen tilt of the pen based on received signal strength for each touch electrode for the first downlink signal and received signal strength for each touch electrode for the second downlink signal.

In such a touch display device, when the pen is tilted by a predetermined angle or more with respect to a surface of the touch panel, the touch electrode receiving a maximum value of the received signal strength for each touch electrode for the first downlink signal and the touch electrode receiving a maximum value of the received signal strength for each touch electrode for the second downlink signal are different from each other.

Each of the first downlink signal and the second downlink signal may be a modulated signal whose voltage level is variable.

The first downlink signal and the second downlink signal may have different amplitudes.

The first downlink signal and the second downlink signal may have a phase difference therebetween.

The first downlink signal and the second downlink signal may be output from the pen during different periods.

The first downlink signal and the second downlink signal may be output from the pen during the same period.

The touch circuit may sense the pen coordinates and the pen tilt of the pen based on the received signal strength for each touch electrode for the first downlink signal and the received signal strength for each touch electrode for the second downlink signal.

In accordance with another aspect of the present disclosure, there is provided a pen including: a housing; a tip configured to protrude to the outside of the housing; a ring configured to be provided inside the housing and to have a shape enclosing an inner side surface of the housing; and a pen driving circuit configured to be provided inside the housing, to be electrically connected to one or more of the tip and the ring, and to output a downlink signal through one or more of the tip and the ring.

In such a pen, the downlink signal output from the tip and the downlink signal output from the ring may have different signal strengths at a position of the tip or may have a phase difference.

In addition, the pen driving circuit may drive the tip and the ring in a time-division manner or simultaneously.

The pen may further include a first switch circuit configured to electrically connect the tip to the pen driving circuit at a first timing when the tip and the ring are driven in the time-division manner, and to electrically connect the ring to the pen driving circuit at a second timing different from the first timing.

The pen may further include a second switch circuit configured to electrically connect the tip and the ring to the pen driving circuit simultaneously when the tip and the ring are driven simultaneously.

In accordance with still another aspect of the present disclosure, there is provided a touch driving circuit including: a driving unit configured to supply an uplink signal to all or some of a plurality of touch electrodes included in a touch panel; and a sensing unit configured to generate and output sensing data when a first downlink signal and a second downlink signal output from a pen are received through all or some of the plurality of touch electrodes.

When the pen is tilted by a predetermined angle or more with respect to a surface of the touch panel, the touch electrode receiving a maximum value of received signal strength for each touch electrode for the first downlink signal and the touch electrode receiving a maximum value of received signal strength for each touch electrode for the second downlink signal may be different from each other.

The first downlink signal and the second downlink signal may have different amplitudes.

The first downlink signal and the second downlink signal may have a phase difference therebetween.

The first downlink signal and the second downlink signal may be output from the pen during different periods.

The first downlink signal and the second downlink signal may be output from the pen during the same period.

In accordance with yet another aspect of the present disclosure, there is provided a pen sensing method including: supplying an uplink signal to all or some of a plurality of touch electrodes included in a touch panel; receiving a first downlink signal and a second downlink signal output from a pen through all or some of the plurality of touch electrodes; and sensing the pen based on received signal strength for each touch electrode for the first downlink signal and received signal strength for each touch electrode for the second downlink signal.

When the pen is tilted by a predetermined angle or more with respect to a surface of the touch panel, the touch electrode receiving a maximum value of the received signal strength for each touch electrode for the first downlink signal and the touch electrode receiving a maximum value of the received signal strength for each touch electrode for the second downlink signal may be different from each other.

The first downlink signal and the second downlink signal may be received during different periods or the same period.

The sensing of the pen coordinates and/or the pen tilt of the pen may include determining tip coordinates of a tip included in the pen from the received signal strength for each touch electrode for the first downlink signal and determining ring coordinates of a ring included in the pen from the received signal strength for each touch electrode for the second downlink signal, calculating a distance between the tip coordinates and the ring coordinates, and determining the pen coordinates by correcting the tip coordinates or the ring coordinates based on the distance between the tip coordinates and the ring coordinates.

The sensing of the pen coordinates and/or the pen tilt of the pen may include determining tip coordinates of a tip included in the pen from the received signal strength for each touch electrode for the first downlink signal and determining ring coordinates of a ring included in the pen from the received signal strength for each touch electrode for the second downlink signal, calculating a distance between the tip coordinates and the ring coordinates, calculating a pen tilt based on the distance between the tip coordinates and the ring coordinates and a distance between the tip and the ring, and determining pen coordinates based on the pen tilt, the pen coordinates, and the ring coordinates.

The sensing of the pen coordinates and/or the pen tilt of the pen may include determining tip coordinates of a tip included in the pen from the received signal strength for each touch electrode for the first downlink signal and determining ring coordinates of a ring included in the pen from the received signal strength for each touch electrode for the second downlink signal, calculating a distance between the tip coordinates and the ring coordinates, calculating a pen tilt for the pen based on the distance based on the tip coordinates and the ring coordinates, calculating a constant correction value of pen coordinate offset based on the distance, and calculating a direction correction value of the pen coordinate offset based on the pen tilt, and determining the pen coordinates based on the tip coordinates or the ring coordinates, the constant correction value of the pen coordinate offset, and the direction correction value.

In accordance with a further aspect of the present disclosure, there is provided a touch system including: a touch display device configured to include a touch panel including a plurality of touch electrodes, and a touch circuit for supplying an uplink signal to all or some of the plurality of touch electrodes and receiving a downlink signal through all or some of the plurality of touch electrodes; and a pen configured to receive the uplink signal and to output the downlink signal.

The touch circuit may receive a first downlink signal and a second downlink signal output from the pen through all or some of the plurality of touch electrodes, and may sense the pen based on received signal strength for each touch electrode for the first downlink signal and received signal strength for each touch electrode for the second downlink signal.

When the pen is tilted by a predetermined angle or more with respect to a surface of the touch panel, the touch electrode receiving a maximum value of received signal strength for each touch electrode for the first downlink signal and the touch electrode receiving a maximum value of received signal strength for each touch electrode for the second downlink signal may be different from each other.

As described above, according to aspects of the present disclosure, it is possible to accurately sense a pen even when the pen is used in a tilted manner by a user.

In addition, according to aspects of the present disclosure, it is possible to provide a pen having two signal transmission media (e.g., a tip and a ring) and to more accurately sense a pen tilt through such a pen.

In addition, according to aspects of the present disclosure, it is possible to sense accurate pen coordinates by correcting a coordinate error due to a pen tilt.

In addition, according to aspects of the present disclosure, it is possible to efficiently sense a pen by driving two signal transmission media (e.g., a tip and a ring) of the pen in a time-division manner.

Further, according to aspects of the present disclosure, it is possible to rapidly sense a pen by simultaneously driving two signal transmission media (e.g, a tip and a ring) of the pen.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
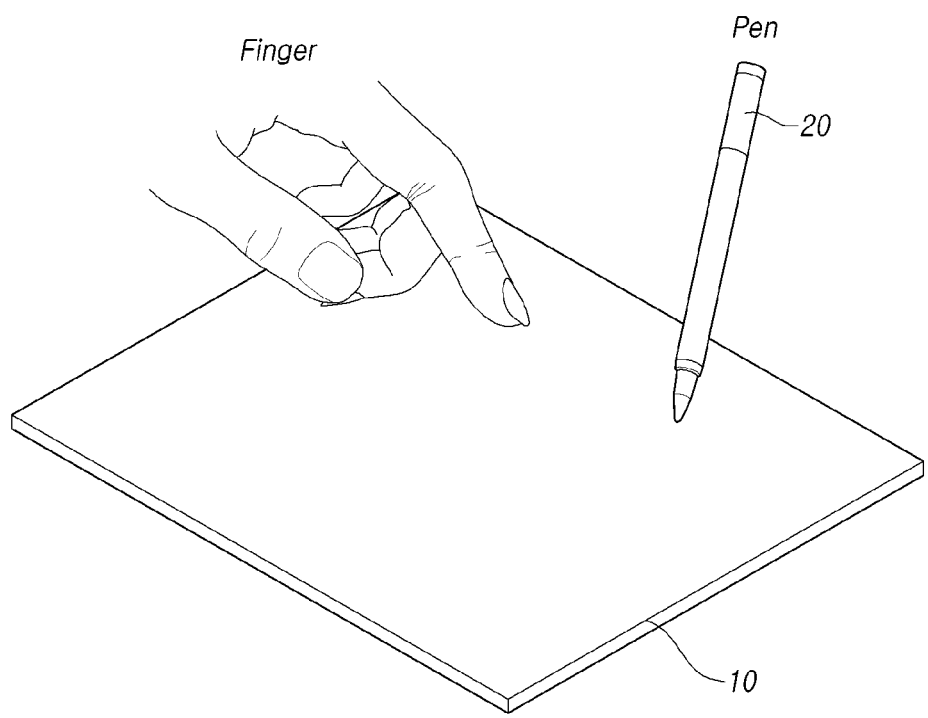
FIG. 1 is a schematic diagram illustrating a touch system according to aspects of the present disclosure.

Hereinafter, exemplary aspects of the present disclosure will be described in detail with reference to the accompanying drawings. In assigning reference numerals to elements in the drawings, the same reference numerals will designate the same elements where possible although they are shown in different drawings. Also, in the following description of the present disclosure, a detailed description of known functions and configurations incorporated herein will be omitted when it may make the subject matter of the present disclosure rather unclear.

In addition, such terms as "first", "second", "A", "B", "(a)", "(b)", and the like, may be used herein when describing elements of the present disclosure. These terms are merely used to distinguish one element from other elements, and the essence of a corresponding element, an order thereof, a sequence thereof, or the number of the corresponding elements are not limited by the terms. When an element is described as being "connected", "coupled", or "linked" to another element, it will be understood that the element may not only be directly connected or coupled to said another element, but may also be "connected", "coupled", or "linked" to said another element through a third element, or the third element may also be interposed between the element and said another element.

FIG. 1 is a schematic diagram illustrating a touch system according to aspects of the present disclosure.

The touch system according to the aspects of the present disclosure may include a touch display device 10, a pen 20 which cooperates with the touch display device 10, and the like.

The touch display device 10 according to the aspects of the present disclosure may not only provide an image display function of displaying an image but also provide a touch sensing function of a finger, the pen 20, or the like.

Here, the "pen 20" may include an active pen which has a signal transmission/reception function, performs a cooperative operation with the touch display device 10, or has its own power, and a passive pen which is a touch tool without the signal transmission/reception function and its own power.

Here, the touch tool refers to not only a finger but also any object capable of touching a screen instead of a finger, and may be referred to as a touch object or a touch pointer.

In the following description, the finger can be regarded as representing a passive touch tool such as a passive pen, and the pen 20 can be regarded as representing an active touch tool such as an active pen. Here, the pen 20 may be referred to as a stylus, a stylus pen, or an active stylus pen.

The touch display device 10 according to the aspects of the present disclosure may be, for example, a television (TV), a monitor, or a mobile device such as a tablet or a smart phone.

The touch display device 10 according to the aspects of the present disclosure may include a display part for providing an image display function and a touch sensing part for touch sensing.

Hereinafter, the structure of the display part and the touch sensing part of the touch display device 10 will be briefly described with reference to FIGS. 2 to 4.

Figure 2:
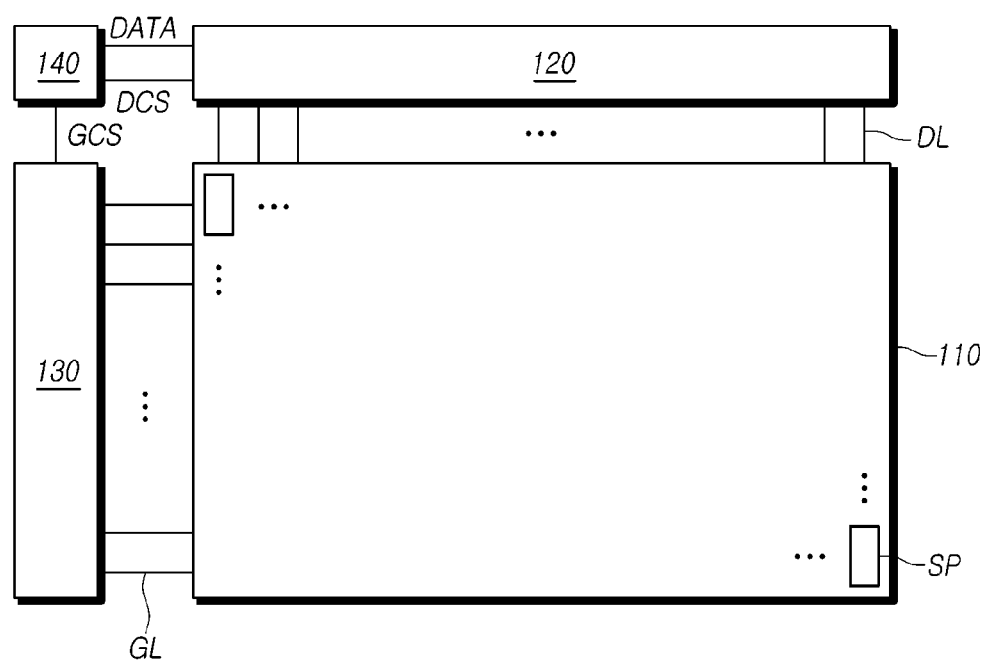
FIG. 2 is a diagram illustrating a display part in a touch display device according to aspects of the present disclosure.

FIG. 2 is a diagram illustrating a display part in the touch display device 10 according to aspects of the present disclosure.

Referring to FIG. 2, the display part of the touch display device 10 according to the aspects of the present disclosure may include a display panel 110, a data driving circuit 120, a gate driving circuit 130, a display controller 140, and the like.

On the display panel 110, a plurality of data lines DL and a plurality of gate lines GL are arranged, and a plurality of subpixels SP defined (partitioned) by the plurality of data lines DL and the plurality of gate lines GL are arranged.

The data driving circuit 120 may supply a data voltage to the plurality of data lines DL to drive the plurality of data lines DL.

The gate driving circuit 130 may sequentially supply scan signals to the plurality of gate lines GL to drive the plurality of gate lines GL.

The display controller 140 may supply various control signals DCS and GCS to the data driving circuit 120 and the gate driving circuit 130 to control the operations of the data driving circuit 120 and the gate driving circuit 130.

The display controller 140 may start to perform scanning in accordance with a timing implemented in each display frame, may switch input image data input from the outside in accordance with a data signal format used by the data driving circuit 120 to output image data DATA, and may control data driving at a proper time in accordance with the scanning.

The display controller 140 may be a timing controller used in a conventional display technology or a control device including a timing controller to further perform other control functions.

The display controller 140 may be implemented as a separate component from the data driving circuit 120, or may be implemented as an integrated circuit together with the data driving circuit 120.

Meanwhile, the data driving circuit 120 may be implemented by including at least one source driver integrated circuit.

Each source driver integrated circuit may include a shift register, a latch circuit, a digital to analog converter (DAC), and an output buffer, etc. In some cases, each source driver integrated circuit may further include an analog to digital converter (ADC).

The gate driving circuit 130 may be implemented by including at least one gate driver integrated circuit.

Each gate driver integrated circuit may include a shift register, a level shifter, and the like.

The data driving circuit 120 may be positioned only on one side (e.g., the upper side or the lower side) of the display panel 110. In some cases, the data driving circuit 120 may be positioned on both sides (e.g., the upper side and the lower side) of the display panel 110 depending on a driving method, a panel design method, or the like.

The gate driving circuit 130 may be positioned only on one side (e.g., the left side or the right side) of the display panel 110. In some cases, the gate driving circuit 130 may be positioned on both sides (e.g., the left side and the right side) of the display panel 110 depending on a driving method, a panel design method, or the like.

Meanwhile, the display panel 110 may be various types of display panels such as a liquid crystal display panel, an organic light emitting display panel, a plasma display panel, etc.

Figure 3:
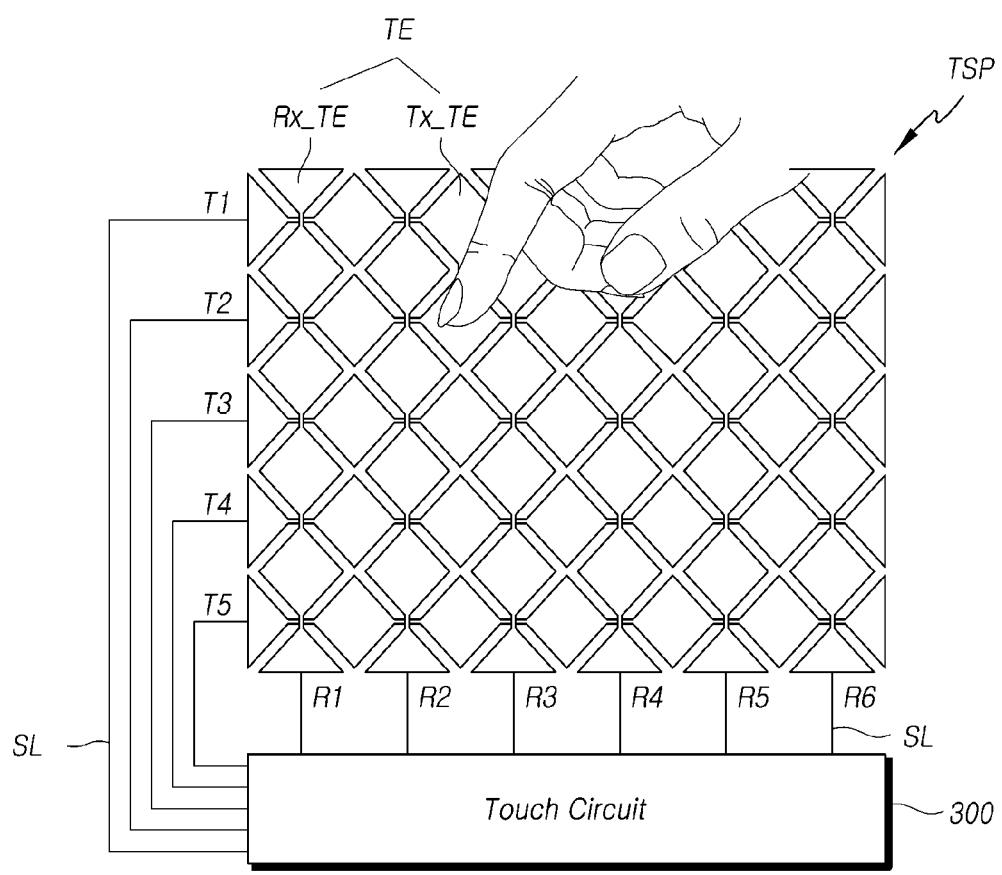
FIGS. 3 and 4 are diagrams illustrating two types of touch sensing parts in a touch display device according to aspects of the present disclosure.
Figure 4:
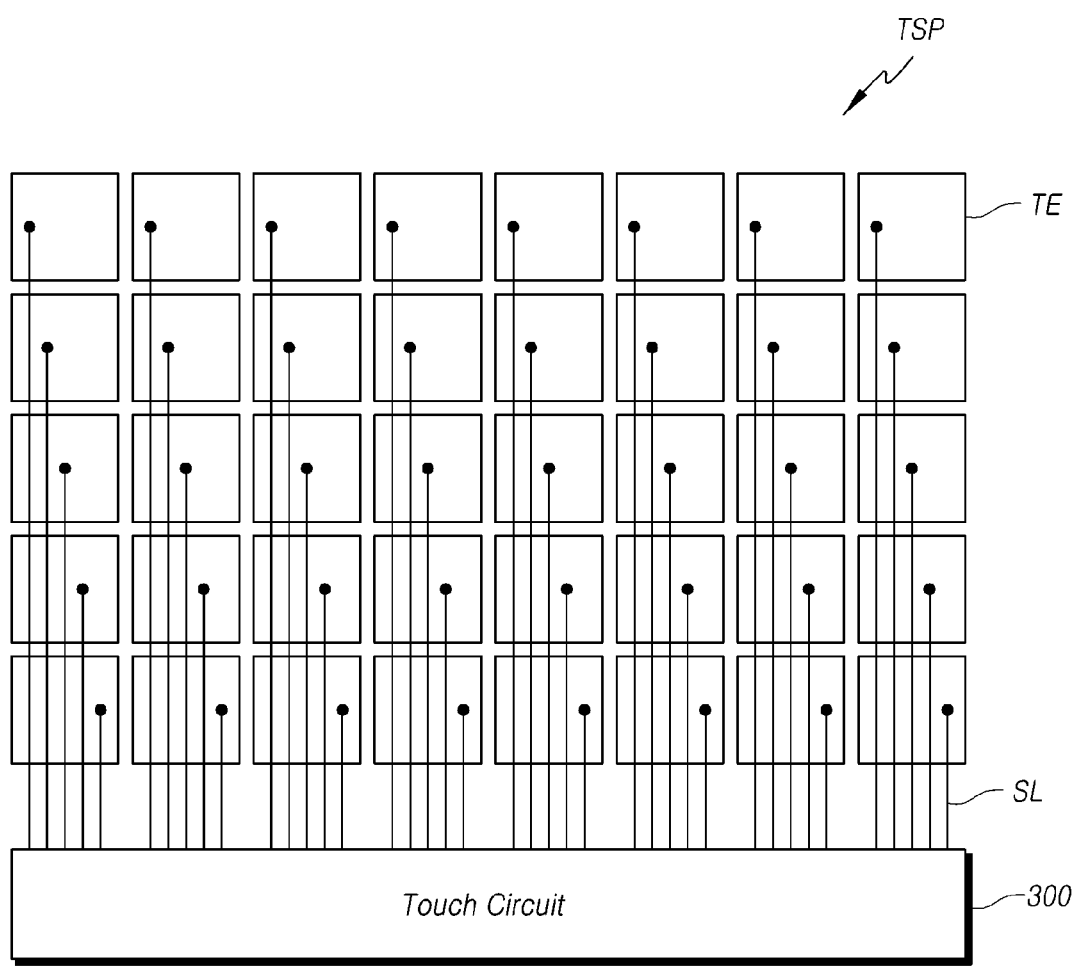

FIGS. 3 and 4 are diagrams illustrating two types of touch sensing parts in a touch display device 10 according to aspects of the present disclosure.

FIG. 3 is a diagram illustrating a touch sensing part for mutual-capacitance-based touch sensing in a touch display device 10 according to aspects of the present disclosure, and FIG. 4 is a diagram illustrating a touch sensing part for self-capacitance-based touch sensing in a touch display 10 device according to aspects of the present disclosure.

Referring to FIGS. 3 and 4, the touch display device 10 may sense the presence or absence of a touch or a touch position by a finger and/or the pen 20 through a capacitance-based touch sensing technique.

To this end, as shown in FIGS. 3 and 4, the touch display device 10 may include a touch panel TSP having a plurality of touch electrodes TE arranged thereon and a touch circuit 300 for driving the touch panel TSP.

The touch display device 10 may provide a mutual-capacitance-based touch sensing function for sensing a touch input by measuring a capacitance formed between two touch electrodes Tx_TE and Rx_TE or a change in the capacitance.

Unlike this, the touch display device 10 may provide a self-capacitance-based touch sensing function for sensing a touch input by measuring a capacitance formed for each touch electrode TE or a change in the capacitance.

Referring to FIG. 3, for the mutual-capacitance-based touch sensing, first touch electrode lines T1 to T5 (also referred to as touch driving lines) to which a touch driving signal is applied and second touch electrode lines R1 to R6 (also referred to as touch sensing lines) in which a touch sensing signal is sensed may be arranged on the touch panel TSP in an intersecting manner.

Each of the first touch electrode lines T1 to T5 may be a bar-type electrode extending in the horizontal direction, and each of the second touch electrode lines R1 to R6 may be a bar-type electrode extending in the vertical direction.

Unlike this, as shown in FIG. 3, each of the first touch electrode lines T1 to T5 may be formed by electrically connecting first touch electrodes Tx_TE (also referred to as touch driving electrodes) arranged in the same row, and each of the second touch electrode lines R1 to R6 may be formed by electrically connecting second touch electrodes Rx_TE (also referred to as touch sensing electrodes) arranged in the same column.

Each of the first touch electrode lines T1 to T5 may be electrically connected to the touch circuit 300 through one or more signal lines SL. Each of the second touch electrode lines R1 to R6 may be electrically connected to the touch circuit 300 through one or more signal lines SL.

Referring to FIG. 4, for self-capacitance-based touch sensing, the plurality of touch electrodes TE may be arranged on the touch panel TSP.

A touch driving signal may be applied to each of the plurality of touch electrodes TE, and a touch sensing signal may be sensed from the same.

Each of the plurality of touch electrodes TE may be electrically connected to the touch circuit 300 through one or more signal lines SL.

Hereinafter, for convenience of description, it is assumed that the touch display device 10 provides a self-capacitance-based touch sensing method and the touch panel TSP is designed as shown in FIG. 4 for self-capacitance-based touch sensing.

The shape of one touch electrode TE shown in FIGS. 3 and 4 is merely exemplary and may be variously designed.

In addition, a size of a region where one touch electrode TE is formed may correspond to a size of a region where one subpixel SP is formed.

Alternatively, the size of the region where one touch electrode TE is formed may be larger than the size of the region where one subpixel SP is formed. In this case, one touch electrode TE may overlap two or more data lines DL and two or more gate lines GL.

For example, the size of the region where one touch electrode TE is formed may correspond to a size of several to several tens of subpixel regions.

Meanwhile, the touch panel TSP may be an external-type (also referred to as an add-on type) touch panel manufactured separately from the display panel 110 and coupled to the display panel 110 or may be an embedded-type (e.g., an in-cell type, an on-cell type, or the like) touch panel embedded in the display panel 110.

When the touch panel TSP is embedded in the display panel 110, at the time of manufacturing the display panel 110, the touch electrodes TE may be formed together with other electrodes or signal wires related to display driving.

Figure 5:
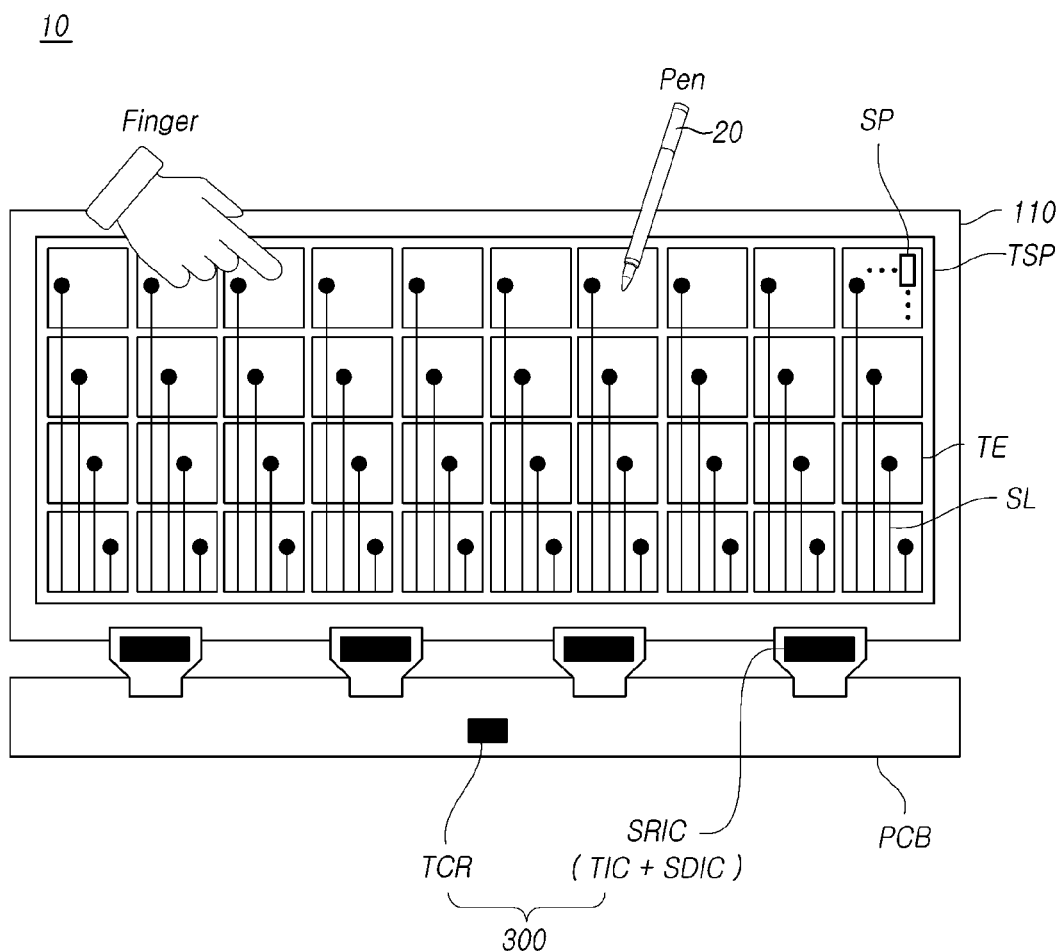
FIG. 5 is a diagram illustrating an implementation example of a touch display device according to aspects of the present disclosure.

FIG. 5 is a diagram illustrating an implementation example of the touch display device 10 according to aspects of the present disclosure. However, FIG. 5 is an implementation example in which the touch panel TSP is embedded in the display panel 110.

Referring to FIG. 5, the touch circuit 300 may include one or more touch driving circuits TIC for supplying a touch driving signal to the touch panel TSP and detecting (receiving) a touch sensing signal from the touch panel TSP, a touch controller TCR for detecting the presence or absence of a touch input and/or a touch position using a touch sensing signal detection result of the touch driving circuit TIC, and the like.

Each of the one or more touch driving circuits TIC included in the touch circuit 300 may be implemented as one integrated circuit (IC).

Meanwhile, the one or more touch driving circuits TIC included in the touch circuit 300 may be implemented integrally with one or more source/readout integrated circuits (SRICs), together with one or more source driver integrated circuits SDICs implementing the data driving circuit 120.

That is, the touch display device 10 may include one or more SRICs, and each of the SRICs may include a touch driving circuit TIC and a SDIC.

In this manner, as to integrated implementation of the touch driving circuit TIC for touch driving and the SDIC for data driving, when the touch panel TSP is the internal-type touch panel embedded in the display panel 110 and the signal lines SL connected to the touch electrodes TE are arranged in parallel with the data lines DL, the touch driving and the data driving may be effectively performed.

Meanwhile, when the touch panel TSP is the internal-type touch panel embedded in the display panel 110, the respective touch electrodes TE can be variously formed.

When the touch display device 10 is implemented as a liquid crystal display device or the like, common electrodes to which a common voltage is applied during a display driving period for displaying an image may be blocked into several blocks and utilized as the touch electrodes TE. For example, a touch driving signal may be applied to the touch electrode TE or a touch sensing signal may be detected from the same during a touch driving period for touch sensing, and a common voltage may be applied to the touch electrode TE during the display driving period for displaying an image.

In this case, during the display driving period, the touch electrodes TE may be electrically connected to each other within the touch circuit 300, and a common voltage may be commonly applied to the touch electrodes TE.

During the touch driving period, some or all of the touch electrodes TE may be selected within the touch circuit 300. Here, a touch driving signal may be applied from the touch driving circuit TIC of the touch circuit 300 to the selected one or more touch electrodes TE, or a touch sensing signal may be detected from the selected one or more touch electrodes TE by the touch driving circuit TIC of the touch circuit 300.

In addition, each of the touch electrodes TE may have a plurality of slits (also referred to as holes) to form an electric field with pixel electrodes within a plurality of overlapping subpixels.

Meanwhile, when the touch display device 10 is implemented as an organic light emitting display device, a plurality of touch electrodes TE and a plurality of signal lines SL may be arranged on the entire surface of the display panel 110, and may be positioned on an encapsulation layer disposed on a common electrode (e.g., a cathode electrode or the like) to which a common voltage is applied.

Here, the common electrode disposed on the entire surface of the display panel 110 may be a cathode electrode of an organic light emitting diode (OLED) within each subpixel SP rather than an anode electrode (corresponding to a pixel electrode) thereof, and the common voltage may be a cathode voltage.

In this case, each of the plurality of touch electrodes TE may be provided in the form of an electrode without an open region (an opening). At this time, each of the plurality of touch electrodes TE may be a transparent electrode for light emission in the subpixels SP.

Alternatively, each of the plurality of touch electrodes TE may be a mesh-type electrode having a plurality of open regions (openings). At this time, in each of the plurality of touch electrodes TE, each open region may correspond to a light emitting region of the subpixel SP (e.g., a region where a part of the anode electrode is positioned).

Meanwhile, when a panel driving signal is supplied to the touch electrodes TE and the signal lines SL during the touch driving period (touch sensing period), the same signal as the panel driving signal or a signal corresponding thereto may be applied to even other electrodes and signal lines that may not be related to touch sensing. Here, the panel driving signal may be a touch driving signal output from the touch circuit 300 to sense a touch input by a finger and/or the pen 20 or to recognize pen information of the pen 20.

For example, during the touch driving period, the panel driving signal or a signal corresponding thereto may be applied to all or some of the data lines DL.

By way of another example, during the touch driving period, the panel driving signal or a signal corresponding thereto may be applied to all or some of the gate lines GL.

By way of still another example, during the touch driving period, the panel driving signal or a signal corresponding thereto may be applied to all or some of the touch electrodes TE.

Meanwhile, in the aspects of the present disclosure, the panel driving signal may refer to all signals applied to the touch panel TSP, the display panel 110, or the display panel 110 including the touch panel TSP embedded therein.

Meanwhile, as to the implementation and arrangement of the integrated circuit, for example, in the touch display device 10, the SRIC may be mounted on a film, one end of the film may be connected to the touch panel TSP, and the other end thereof may be connected to a printed circuit board (PCB) in order to electrically connect the touch driving circuit TIC and the SDIC to the display panel 110. In this case, the SRIC may be referred to as a chip on film (COF) type SRIC.

A mounted touch controller TCR may be mounted on a PCB connected to a film on which the SRIC is mounted.

Meanwhile, the SRIC may also be implemented as a chip on glass (COG) type SRIC that is bonded onto the touch panel TSP.

Meanwhile, one or more touch driving circuits TIC and the touch controller TCR of the touch circuit 300 may be integrated into one component and implemented.

Figure 6:
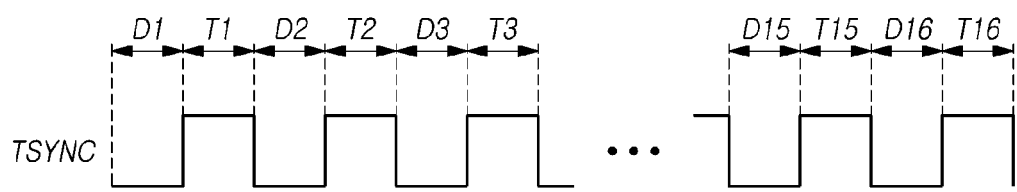
FIG. 6 is a diagram illustrating a driving timing indicating time-division driving methods of display driving and touch driving of a touch display device according to aspects of the present disclosure.

FIG. 6 is a diagram illustrating a driving timing indicating time-division driving methods of display driving and touch driving of the touch display device 10 according to aspects of the present disclosure.

Referring to FIG. 6, the touch display device 10 according to the aspects of the present disclosure may perform, in a time-division manner, "display driving" for displaying an image and "touch driving" (finger touch driving and/or pen touch driving) for sensing a touch (or a finger touch and/or a pen touch) by a finger and/or the pen 20.

In the touch display device 10, display driving periods D1, D2, . . . and touch driving periods T1, T2, . . . are alternately assigned.

The display driving may be performed to display an image during the display driving periods D1, D2, . . . , and the touch driving (finger touch driving and/or pen touch driving) may be performed to sense a finger touch or a pen touch during the touch driving periods T1, T2, . . .

In the case of the time-division driving method, the touch driving periods T1, T2, . . . may be blank periods during which the display driving is not performed.

Meanwhile, the touch display device 10 may generate a synchronization signal TSYNC that swings to a high-level and a low-level, and may identify or control the display driving periods D1, D2, . . . and the touch driving periods T1, T2, . . . using the synchronization signal TSYNC. That is, the synchronization signal TSYNC may be a driving timing control signal defining the touch driving periods T11, T2, . . .

For example, a high-level interval (or a low-level interval) of the synchronization signal TSYNC may indicate the touch driving periods T1, T2, . . . , and a low-level interval (or a high-level interval) of the synchronization signal TSYNC may indicate the display driving periods D1, D2, . . .

Meanwhile, a single display frame period may include one display driving period and one touch driving period. In this case, after one display frame screen is displayed, the touch driving may be performed.

Unlike this, the single display frame period may include two or more display driving periods and two or more touch driving periods.

For example, referring to FIG. 6, the single display frame period may include 16 display driving periods D1 to D16 and 16 touch driving periods T1 to T16. In this case, a single display frame screen may be divided by ¹⁄₁₆ to be displayed, and the touch driving may be performed between the divided display frame screens.

Figure 7:
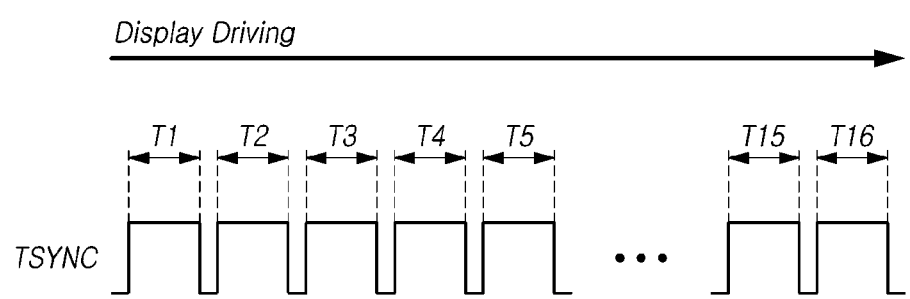
FIG. 7 is a diagram illustrating a driving timing indicating independent driving methods of display driving and touch driving of a touch display device according to aspects of the present disclosure.

FIG. 7 is a diagram illustrating a driving timing indicating independent driving methods of display driving and touch driving of the touch display device 10 according to aspects of the present disclosure.

Referring to FIG. 7, the touch display device 10 according to the aspects of the present disclosure may independently perform "display driving" for displaying an image and "touch driving" (finger touch driving and/or pen touch driving) for sensing a touch (a finger touch and/or a pen touch) by a finger and/or the pen 20.

In this case, the display driving and the touch driving may be performed in different time zones, which have been time-divided, or may be performed simultaneously in the same time zone, as shown in FIG. 6. Alternatively, the display driving and the touch driving may be performed in the time-division manner and then may be simultaneously performed at an arbitrary timing.

When the display driving and the touch driving are performed independently, the touch driving may be performed regardless of the display driving, and conversely, the display driving may be performed regardless of the touch driving.

In the touch display device 10, the display driving periods D1, D2, . . . and the touch driving periods T1, T2, . . . are alternately assigned.

For example, when the display driving and the touch driving are simultaneously performed, the touch driving may be performed so that a finger touch or a pen touch may be sensed while an image is displayed according to the display driving.

When the display driving and the touch driving are performed independently, the display driving period may be controlled by a normal display driving control signal (e.g., a vertical synchronization signal (Vsync) or the like). The touch driving period may be controlled by the synchronization signal TSYNC.

In this case, unlike the synchronization signal TSYNC of FIG. 6 which separately defines the display driving periods D1, D2, . . . and the touch driving periods T1, T2, . . . , the synchronization signal TSYNC may define only the touch driving periods T1, T2, . . .

For example, a period in which the synchronization signal TSYNC is at a high-level (or a low-level) may indicate the touch driving periods T1, T2, . . . in which touch driving is performed, and a period in which the synchronization signal TSYNC is at a low-level (or a high-level) may indicate a period during which touch driving is not performed.

Meanwhile, during one high-level period (or low-level period) in the synchronization signal TSYNC, i.e., during one touch driving period, a finger touch and/or a pen touch may be sensed once in the entire screen region. In this case, one touch driving period may correspond to one touch frame period.

Unlike this, during two or more high-level periods (or low-level periods) in the synchronization signal TSYNC, i.e., during two or more touch driving periods, a finger touch and/or a pen touch may be sensed once in the entire screen region. In this case, the two or more touch driving periods may correspond to one touch frame period.

For example, during 16 high-level periods (or low-level periods) in the synchronization signal TSYNC, i.e., during 16 touch driving periods, a finger touch and/or a pen touch may be sensed once in the entire screen region. In this case, the 16 touch driving periods may correspond to one touch frame period.

Meanwhile, in each of the touch driving periods T1, T2, . . . , finger touch driving for sensing a finger touch or pen touch driving for sensing a pen touch may be performed.

In addition, the touch panel TSP may be embedded in the display panel 110 or may be present outside the display panel 110. Hereinafter, for convenience of description, a case in which the touch panel TSP is embedded in the display panel 110 will be described as an example, and the touch panel TSP is also simply referred to as a panel TSP.

Figure 8:
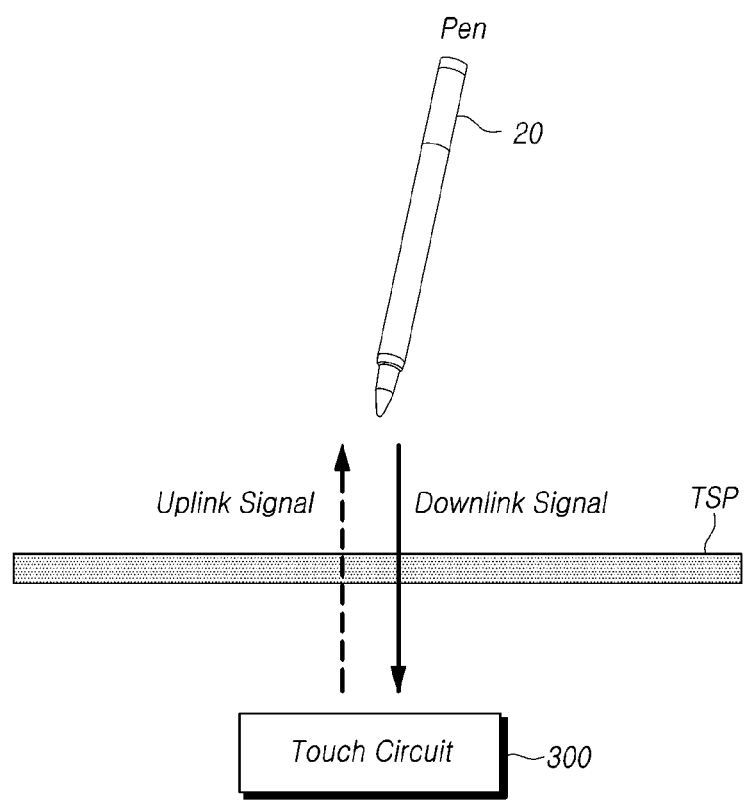
FIG. 8 is a diagram illustrating a touch driving operation between a touch display device and a pen according to aspects of the present disclosure.

FIG. 8 is a diagram illustrating a touch driving operation between the touch display device 10 and the pen 20 according to aspects of the present disclosure.

At the time of pen touch driving for sensing a pen touch, the touch circuit 300 of the touch display device 10 may transmit and receive signals to and from the pen 20 via the touch panel TSP.

A signal supplied from the touch circuit 300 to the touch panel TSP and transmitted to the pen 20 through the touch panel TSP is referred to as an uplink signal, and a signal output from the pen 20 to the touch panel TSP and transmitted to the touch circuit 300 through the touch panel TSP is referred to as a downlink signal.

A method and timing for signal transmission and reception between the touch display device 10 and the pen 20 for pen touch driving and pen touch sensing therethrough, a format of a signal to be transmitted and received, and the like may be predefined by a protocol. Such a protocol may be implemented by a program or a code or data related to program execution and stored in the touch circuit 300 and the pen 20 or may be executed by the touch circuit 300 and the pen 20.

For the pen touch driving for sensing a pen touch, the touch display device 10 may define a cooperative operation between the touch display device 10 and the pen 20, may control a driving operation of the pen 20, or may provide an uplink signal including various kinds of information necessary for the driving operation of the pen 20.

More specifically, the touch circuit 300 of the touch display device 10 supplies the uplink signal to one or more of the plurality of touch electrodes TE included in the touch panel TSP. Accordingly, the pen 20 adjacent to the touch panel TSP may receive the uplink signal through the one or more of the plurality of touch electrodes TE included in the touch panel TSP.

The pen 20 may output a downlink signal that causes the touch circuit 300 to sense pen coordinates (referred to as a position) of the pen 20 and/or a pen tilt (referred to simply as a tilt), in response to the uplink signal transmitted from the touch display device 10.

Alternatively, the pen 20 may output a downlink signal indicating various kinds of additional information, etc., in response to the uplink signal transmitted from the touch display device 10.

In this manner, the downlink signal output from the pen 20 may be applied to the one or more of the plurality of touch electrodes TE included in the touch panel TSP.

The touch circuit 300 of the touch display device 10 may receive the downlink signal output from the pen 20 via the one or more touch electrodes TE, and may sense the pen coordinates and/or the pen tilt of the pen 20 or recognize various kinds of additional information about the pen 20, based on the received downlink signal.

The above-mentioned uplink signal may include, for example, a beacon or a ping signal.

The beacon is a control signal that defines the cooperative operation between the touch display device 10 and the pen 20, controls the driving operation of the pen 20, or includes various kinds of information necessary for the driving operation of the pen 20.

For example, the beacon may include panel information (e.g., panel status information, panel identification information, panel type information such as an in-cell type, etc.), panel driving mode information (e.g., mode identification information such as a pen search mode or a pen mode), characteristic information of the downlink signal (e.g., frequency, the number of pulses, etc.), driving timing-related information, multiplexer driving information, power mode information (e.g., UM information about that panel and pen driving is not performed to reduce power consumption, etc.), and may further include information for driving synchronization between the display touch panel TSP and the pen 20.

The ping signal may be a synchronization control signal for synchronization of the downlink signal.

The additional information that may be included in the downlink signal may include, for example, one or more of a pen pressure, a pen ID, button information, battery information, information for information error checking and correction, and the like.

Figure 9:
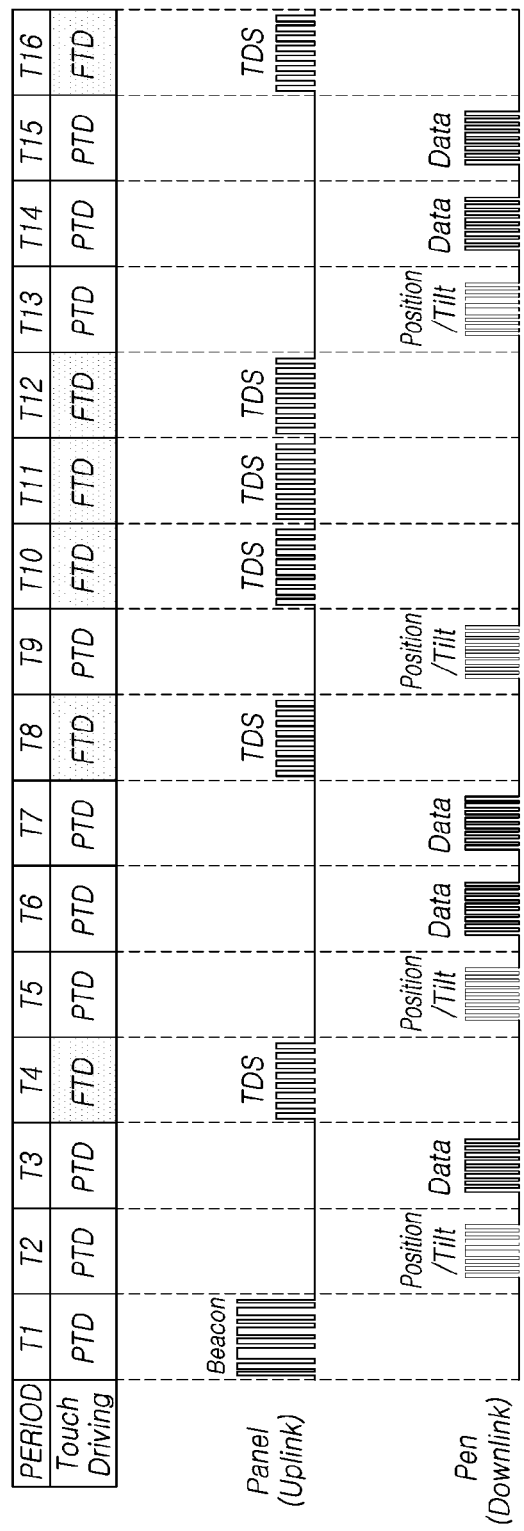
FIG. 9 is a diagram illustrating an example of a driving timing for a touch driving operation between a touch display device and a pen according to aspects of the present disclosure.

FIG. 9 is a diagram illustrating an example of a driving timing for a touch driving operation between the touch display device 10 and the pen 20 according to aspects of the present disclosure. However, it is assumed that 16 touch driving periods T1 to T16 are regularly repeated. In this case, the 16 touch driving periods T1 to T16 may be referred to as one touch frame period, and both a finger touch and a pen touch may be sensed during one touch frame period.

FIG. 9 shows a downlink signal output from the pen 20 and various signals (including an uplink signal) supplied to the touch panel TSP by the touch circuit 300, according to a predetermined timing by a protocol.

Referring to FIG. 9, a beacon, which is one of the uplink signals, may be transmitted from the touch panel TSP to the pen 20 one or more times during one touch frame period corresponding to the 16 touch driving periods T1 to T16, and a beacon transmission period may be one or two or more touch driving periods (T1 in an example of FIG. 9) predetermined by a protocol in the 16 touch driving periods T1 to T16.

Meanwhile, the beacon may be periodically transmitted every one touch frame period, may be periodically transmitted every two or more touch frame periods, or may be transmitted in an arbitrary touch frame period according to a predetermined event or the like.

When the beacon is transmitted from the touch panel TSP to the pen 20, the pen 20 may output a downlink signal in the touch driving periods (T2, T3, T5, T6, T7, T9, T13, T14, and T15 in the example of FIG. 9) determined according to a predefined protocol, in response to the beacon.

The downlink signal output from the pen 20 may be a downlink signal that allows the touch display device 10 to sense pen coordinates (position) and a pen tilt of the pen 20.

For example, one downlink signal output from the pen 20 may be a downlink signal that allows the touch display device 10 to sense one of the pen coordinates and the pen tilt of the pen 20, or may be a downlink signal that allows the touch display device 10 to sense both the pen coordinates and the pen tilt of the pen 20.

In addition, the downlink signal output from the pen 20 may be a downlink signal indicating data including various kinds of additional information of the pen 20. Here, the data includes the various kinds of additional information of the pen 20, and the various kinds of additional information may include, for example, a pen pressure, a pen ID, button information, battery information, information for information error checking and correction, etc.

The downlink signal output from the pen 20 may be applied to one or more of a plurality of touch electrodes TE included in the touch panel TSP.

Meanwhile, referring to FIG. 9, the 16 touch driving periods T1 to T16 included in one touch frame period may include one or more touch driving periods (e.g., T2, T5, T9, and T13) for sensing one or more of the pen coordinates and the pen tilt.

In accordance with such touch driving periods (e.g., T2, T5, T9, and T13), the pen 20 may output a downlink signal related to sensing of one or more of the pen coordinates and the pen tilt.

In this case, the downlink signal may be a signal composed of pulses periodically swinging between a high level and a low level.

In addition, referring to FIG. 9, the 16 touch driving periods T1 to T16 included in one touch frame period may include one or more touch driving periods (e.g., T3, T6, T7, T14, and T15) capable of sensing data.

The pen 20 may output a downlink signal related to data sensing in accordance with the touch driving periods (e.g., T3, T6, T7, T14, and T15).

In this case, the downlink signal may be a signal composed of aperiodic pulses representing additional information included in the corresponding data.

As described above, when the downlink signal is output from the pen 20 in accordance with the touch driving periods defined in the protocol, the touch circuit 300 may receive the downlink signal through the touch panel TSP and may perform a pen sensing process based on the received downlink signal.

Here, the pen sensing process may include one or more of a process of sensing the pen coordinates, a process of sensing the pen tilt, and a process of recognizing pen additional information included in the data.

Meanwhile, the 16 touch driving periods T1 to T16 included in one touch frame period may include one or more touch driving periods (e.g., T4, T6, T10, T11, T12, and T16) for sensing a finger touch.

During the one or more touch driving periods (e.g., T4, T6, T10, T11, T12, and T16), the touch circuit 300 may supply a touch driving signal TDS for sensing the finger touch to all or some of the plurality of touch electrodes TE included in the touch panel TSP.

The touch driving signal TDS may be a signal swinging between a high level and a low level. That is, the touch driving signal TDS may be a modulated signal whose voltage level is variable.

Meanwhile, during the remaining touch driving periods (e.g., T2, T3, T5, T6, T7, T9, T13, T14, and T15) except for the touch driving period (e.g., T1) corresponding to the beacon transmission period among the touch driving periods (e.g., T1, T2, T3, T5, T6, T7, T9, T13, T14 and T15) for sensing a pen touch, the touch circuit 300 may supply a DC voltage having a constant voltage level to the touch panel TSP.

Here, the DC voltage may be a low-level voltage such as a touch driving signal TDS or a beacon, may be a high-level voltage, may be an arbitrary voltage between the low-level voltage and the high-level voltage, or may be a ground voltage.

In FIG. 9, touch driving performed during the touch driving periods (e.g., T1, T2, T3, T5, T6, T7, T9, T13, T14, T15) for sensing the pen touch is referred to as pen touch driving (PTD). Touch driving performed during the touch driving periods (e.g., T4, T6, T10, T11, T12, and T16) for sensing the finger touch is referred to as finger touch driving (FTD).

Figure 10:
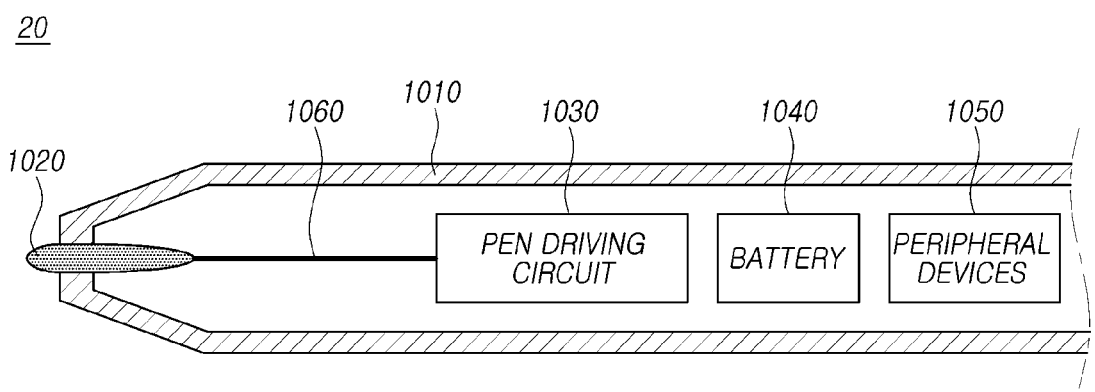
FIG. 10 is a diagram illustrating a pen according to aspects of the present disclosure.

FIG. 10 is a diagram illustrating the pen 20 according to the aspects of the present disclosure.

Referring to FIG. 10, the pen 20 according to aspects of the present disclosure may include a housing 1010 configured to correspond to a case, a tip 1020 configured to protrude to the outside of the housing 1010, and a pen driving circuit 1030 configured to be provided inside the housing 1010, to be electrically connected to the tip 1020 through one or more signal lines 1060, and to output a downlink signal through the tip 1020.

In addition, referring to FIG. 10, the pen 20 according to the aspects of the present disclosure may further include a battery 1040 configured to supply power and various peripheral devices 1050 such as a button, a communication module, a display, and the like.

Meanwhile, the pen driving circuit 1030 may receive an uplink signal (e.g., a beacon, a ping signal, or the like) through one or more touch electrodes TE arranged on the touch panel TSP.

The pen driving circuit 1030 may further include a reception unit for receiving an uplink signal through the tip 1020, a transmission unit for transmitting a downlink signal through the tip 1020, and a controller for controlling a pen driving operation, and may further include a pressure portion for measuring a pen pressure, and the like.

Meanwhile, the housing 1010 may electrically serve as a ground.

Figure 11:
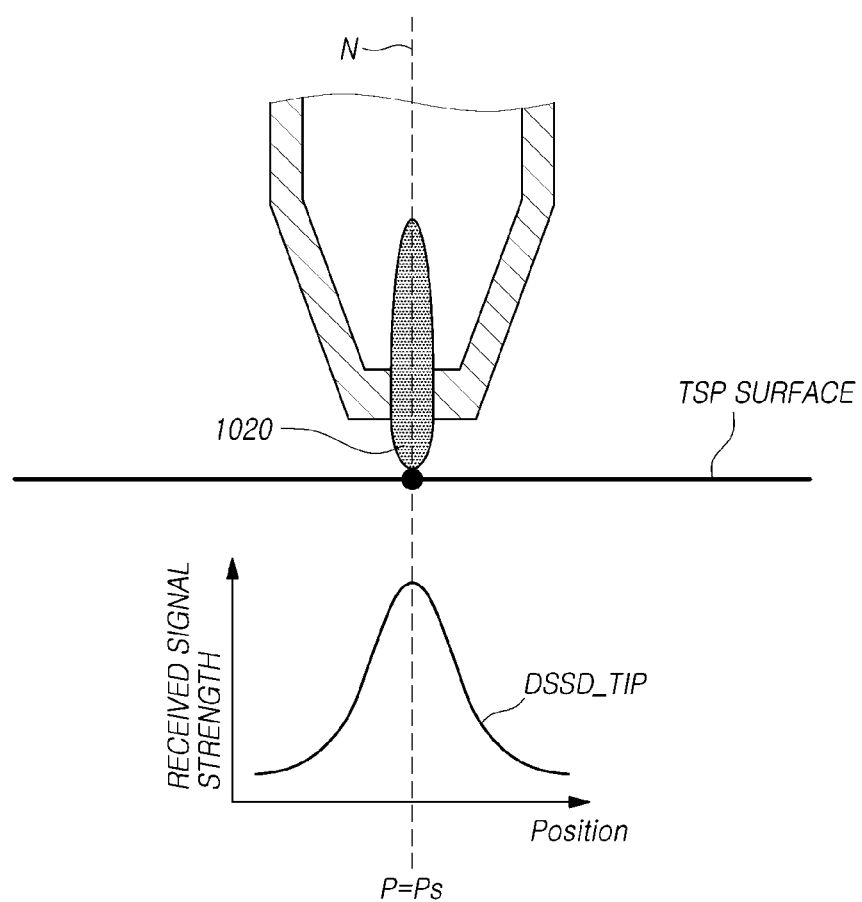
FIG. 11 is a diagram illustrating a distribution of received signal strength for each touch electrode with respect to a downlink signal output from a pen when the pen is vertically used according to aspects of the present disclosure.
Figure 12:
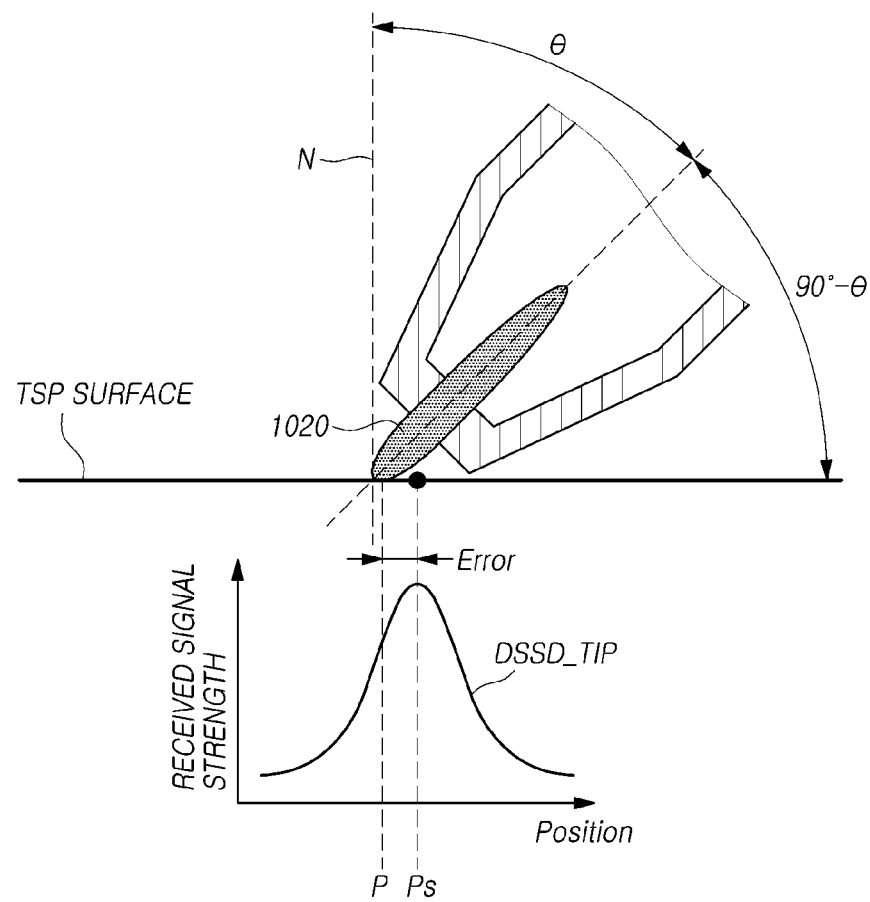
FIG. 12 is a diagram illustrating a distribution of received signal strength for each touch electrode with respect to a downlink signal output from a pen when the pen is used in a tilted manner according to aspects of the present disclosure.

FIG. 11 is a diagram illustrating a distribution of received signal strength for each touch electrode TE with respect to a downlink signal output from the pen 20 when the pen 20 is vertically used according to aspects of the present disclosure. FIG. 12 is a diagram illustrating a distribution of received signal strength for each touch electrode TE with respect to a downlink signal output from the pen 20 when the pen 20 is used in a tilted manner according to aspects of the present disclosure.

Referring to FIGS. 11 and 12, a downlink signal output from the pen 20 may be applied only to one touch electrode TE corresponding to a point where the pen 20 is positioned among the plurality of touch electrodes TE included in the touch panel TSP, but may be typically applied to both the touch electrode TE corresponding to the point where the pen 20 is positioned and two or more touch electrodes TE positioned in the vicinity thereof.

The signal strengths of the downlink signals applied to the two or more touch electrodes TE may be different from each other.

That is, the signal strength of the downlink signal applied to the touch electrode TE closer to the point where the pen 20 is positioned may be larger, and the signal strength of the downlink signal applied to the touch electrode TE farther away from the point where the pen 20 is positioned may be smaller.

Accordingly, the received signal strength of the downlink signal received by the touch circuit 300 through each of the two or more touch electrodes TE may be different from each other.

As to the received signal strength of the downlink signal, which has been received by the touch circuit 300 through each of the two or more touch electrodes TE, for each touch electrode, a distribution DSSD_TIP may be shown in which the received signal strength of the downlink signal received through the touch electrode TE closest to the point where the pen 20 is positioned may be the highest (maximum value) and the received signal strength of the downlink signal received through the touch electrode TE positioned far from the point where the pen 20 is positioned decreases, as shown in FIG. 11.

Such a distribution DSSD_TIP indicates the received signal strength of the downlink signal received for each touch electrode when the touch circuit 300 receives the downlink signal, output through the tip 1020 of the pen 20, via each of the two or more touch electrodes TE. Hereinafter, the distribution DSSD_TIP may be referred to as a tip-related received signal strength distribution DSSD_TIP.

Graphs of the tip-related received signal strength distribution DSSD_TIP in FIGS. 11 and 12 show the received signal strength of the downlink signal received for each position (for each touch electrode).

The touch circuit 300 may sense pen coordinates Ps based on the tip-related received signal strength distribution DSSD_TIP.

The sensed pen coordinates Ps may correspond to a position (touch electrode) where the received signal strength is the maximum value in the tip-related received signal strength distribution DSSD_TIP.

Meanwhile, as shown in FIG. 11, when a user uses the pen 20 vertically, the center axis of the pen 20 may be parallel (or identical) to a normal line N (vertical line) of the surface of the touch panel TSP or substantially parallel (identical) thereto.

In this case, the pen coordinates Ps sensed from the tip-related received signal strength distribution DSSD_TIP may be substantially the same as an actual position P at which the pen 20 actually contacts or is close to the surface of the touch panel TSP (P=Ps).

However, as shown in FIG. 12, when the user uses the pen 20 in a tilted manner, the center axis of the pen 20 may have a predetermined angle θ with the normal line N (vertical line) of the surface of the touch panel TSP.

As the user tilts the pen 20 more heavily, the angle θ between the center axis of the pen 20 and the normal line N (vertical line) of the surface of the touch panel TSP may become larger. This angle θ may be referred to as a pen tilt. In some cases, the pen tilt may be defined as (90 degrees-θ).

As shown in FIG. 12, when the user uses the pen 20 in the tilted manner, the pen coordinates Ps sensed from the tip-related received signal strength distribution DSSD_TIP may be different from the actual position P at which the pen 20 actually contacts or is close to the surface of the touch panel TSP (PCPs).

In this manner, when the sensed pen coordinates Ps and the actual position P are different from each other, an error occurs at the time of pen touch sensing.

Accordingly, touch input processing (e.g., icon click (selection) processing, handwriting processing, drawing processing, etc.) may be performed at a point different from the point P at which the pen 20 actually touches the surface of the touch panel TSP by the user. In this case, the touch display device 10 may malfunction, for example failing to perform an operation related to the pen touch input or performing an irrelevant operation, and may perform a touch-related display at a point different from a point at which the user touches (writes) using the pen 20. This phenomenon may become worse depending on whether the user is right-handed or left-handed. This phenomenon is referred to as "pen sensing error phenomenon caused by pen tilt".

Hereinafter, a touch system capable of preventing "pen sensing error phenomenon caused by pen tilt", the touch display device 10 and the pen 20 included in the touch system, a touch driving circuit TIC, and a pen sensing method will be described.

Figure 13:
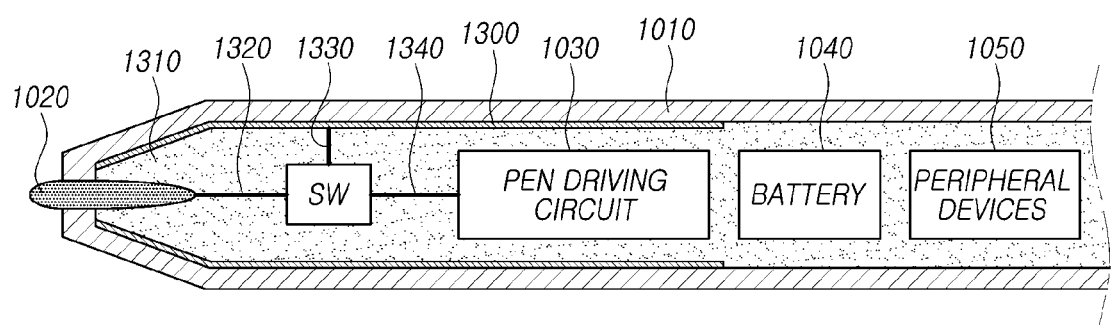
FIG. 13 is a diagram illustrating a pen according to aspects of the present disclosure.
Figure 14:
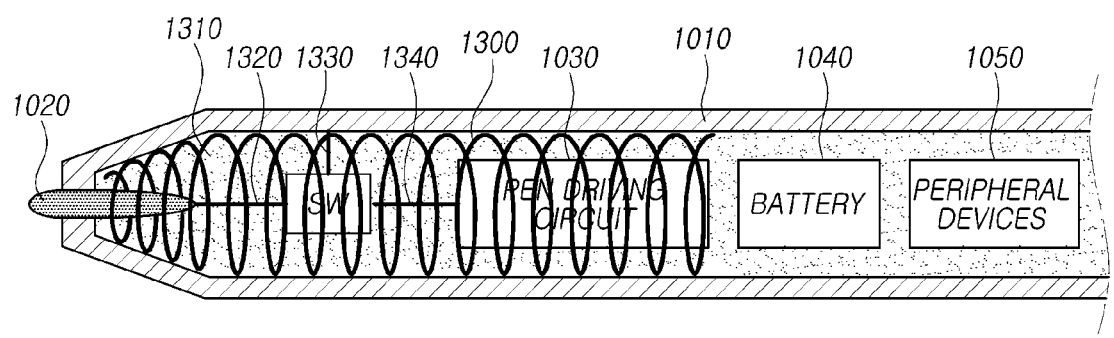
FIG. 14 is a diagram illustrating a ring structure in a pen according to aspects of the present disclosure.

FIGS. 13 and 14 are other diagrams illustrating the pen 20 according to the aspects of the present disclosure.

Referring to FIGS. 13 and 14, the pen 20 according to the aspects of the present disclosure may include a housing 1010 configured to correspond to a case, a tip 1020 configured to protrude to the outside of the housing 1010, and a pen driving circuit 1030 configured to be provided inside the housing 1010 and to output a downlink signal through the tip 1020, and may further include a battery 1040 configured to supply power and various peripheral devices 1050 such as a button, a communication module, a display, and the like. Meanwhile, the housing 1010 may electrically serve as a ground.

Referring to FIGS. 13 and 14, the pen 20 according to the aspects of the present disclosure may further include a ring 1300 configured to be provided inside the housing 1010 and to have a shape that encloses an inner side surface of the housing 1010, unlike the structure of FIG. 10.

Since the ring 1300 does not protrude to the outside of the housing 1010, the ring 1300 does not come in contact with the touch panel TSP, but may function similar to the tip 1020.

As the tip 1020 serves as a medium (or a transmission antenna) through which a downlink signal is transmitted, the ring 1300 may also serve as the medium (or a transmission antenna) through which the downlink signal is transmitted.

Accordingly, the pen driving circuit 1030 may be provided inside the housing 1010, may be electrically connected to one or more of the tip 1020 and the ring 1300, and may output a downlink signal through one or more of the tip 1020 and the ring 1300.

The pen driving circuit 1030 may be electrically connected to one or more of the tip 1020 and the ring 1300 via a switch SW.

The tip 1020 and the switch SW may connected to each other through a tip wiring 1320, and the ring 1300 and the switch SW may be connected to each other through a ring wiring 1330. The pen driving circuit 1030 and the switch SW may be connected to each other through a circuit wiring 1340.

The switch SW may select one or more of the tip 1020 and the ring 1300 and may connect the selected one or more to the pen driving circuit 1030.

Meanwhile, the tip 1020 and the ring 1300 are conductors and electrically separated from each other. Thus, there is an insulating material 1310 made of plastic or the like between the tip 1020 and the ring 1300.

Meanwhile, as the tip 1020 serves as a medium (or reception antenna) through which an uplink signal is received, the ring 1300 may also serve as the medium (or reception antenna) through which the uplink signal is received.

The ring 1300 may have a coil shape, as shown in FIG. 14.

Meanwhile, a downlink signal having the same signal strength may be output from the tip 1020 and the ring 1300, and a downlink signal may be output from the ring 1300.

However, the downlink signal output from the tip 1020 and the downlink signal output from the ring 1300 may have different signal strengths at the position of the tip 1020.

For example, the signal strength of the downlink signal output from the ring 1300 may be attenuated by a gap L from the ring 1300 to the tip 1020, when measured at the position of the tip 1020.

Accordingly, the signal strength of the downlink signal output from the ring 1300 may be smaller than the signal strength of the downlink signal output from the tip 1020, when measured at the position of the tip 1020.

Meanwhile, the downlink signal output from the tip 1020 and the downlink signal output from the ring 1300 may have a phase difference.

For example, there may be a phase difference of 180 degrees between the downlink signal output from ring 1300 and the downlink signal output from tip 1020.

As described above, when the pen 20 includes the tip 1020 and the ring 1300 as two signal transmission media, and the downlink signals output respectively from the tip 1020 and the ring 1300 have a phase difference or they are received by the touch panel TSP, different received signal strengths may be exhibited, and therefore the touch display device 10 may more accurately sense the pen 20.

Figure 15:
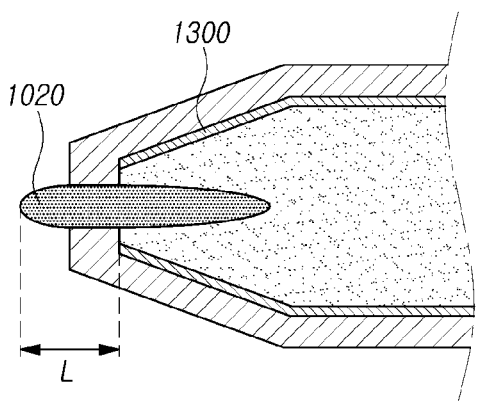
FIGS. 15 and 16 are diagrams illustrating a distance between a tip and a ring in a pen according to aspects of the present disclosure.
Figure 16:
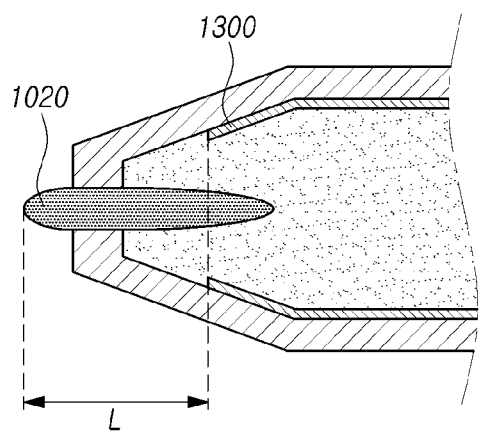

FIGS. 15 and 16 are diagrams illustrating a gap L between the tip 1020 and the ring 1300 in the pen 20 according to aspects of the present disclosure.

Referring to FIGS. 15 and 16, the ring 1300 may be positioned close to or farther away from the end of the tip 1020.

As shown in FIG. 15, when the ring 1300 is positioned close to the end of the tip 1020, the gap L between the tip 1020 and the ring 1300 is shortened.

Accordingly, the downlink signal output from the ring 1300 may be applied to the touch panel TSP in a less attenuated state and may be received by the touch circuit 300.

As shown in FIG. 16, when the ring 1300 is positioned farther away from the end of the tip 1020, the gap L between the tip 1020 and the ring 1300 becomes longer.

Accordingly, the downlink signal output from the ring 1300 may be applied to the touch panel TSP in a more attenuated state. Therefore, the received signal strength of the downlink signal received by the touch circuit 300 may be smaller than that of the case of FIG. 15.

Meanwhile, in the following description, in order to distinguish the downlink signal output from the tip 1020 and the downlink signal output from the ring 1300, the downlink signal output from the tip 1020 is referred to as a first downlink signal, and the downlink signal output from the ring 1300 is referred to as a second downlink signal.

Figure 17:
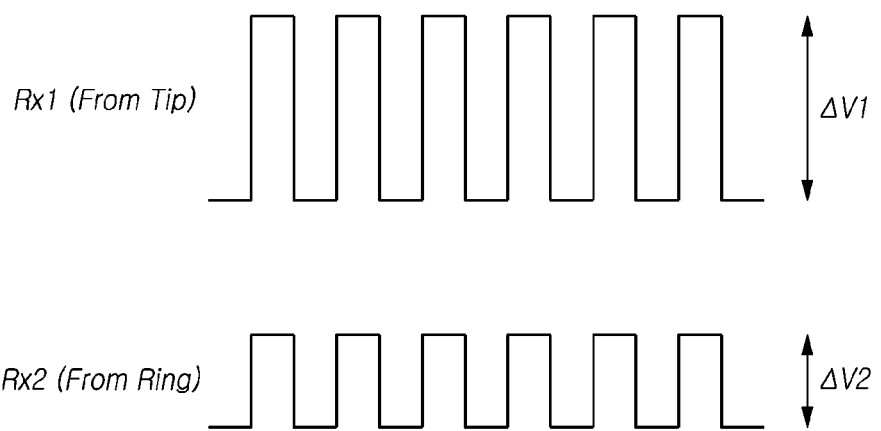
FIGS. 17 and 18 are diagrams illustrating a first downlink signal and a second downlink signal which are respectively output from a tip and a ring of a pen according to aspects of the present disclosure and received by a touch driving circuit.
Figure 18:
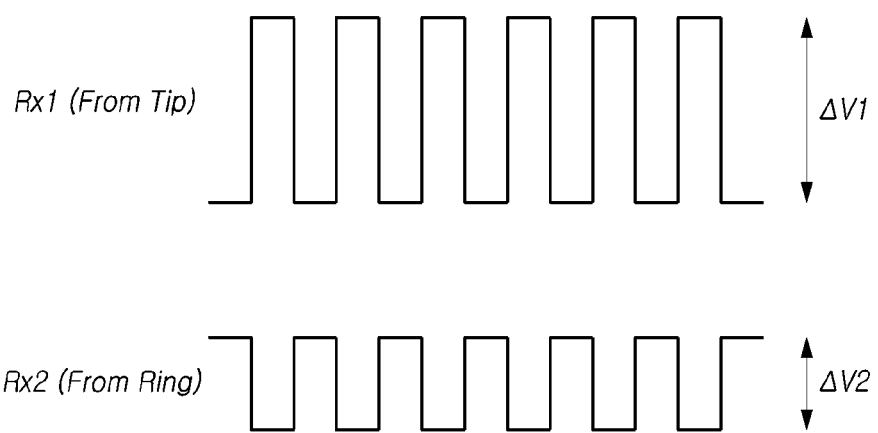

FIGS. 17 and 18 are diagrams illustrating a first downlink signal Rx1 and a second downlink signal Rx2 which are respectively output from the tip 1020 and the ring 1300 of the pen 20 according to aspects of the present disclosure and received by a touch driving circuit TIC.

The touch driving circuit TIC may simultaneously receive a first downlink signal Rx1 and a second downlink signal Rx2 or may receive them at different time zones.

Referring to FIGS. 17 and 18, the first downlink signal Rx1 and the second downlink signal Rx2 received by the touch driving circuit TIC may be a modulated signal whose voltage level is variable.

Accordingly, the touch driving circuit TIC may accurately sense pen coordinates and a pen tilt using the first downlink signal Rx1 and the second downlink signal Rx2.

Referring to FIGS. 17 and 18, the first downlink signal Rx1 and the second downlink signal Rx2 received by the touch driving circuit TIC may have different amplitudes $\Delta V1$ and $\Delta V2$.

More specifically, the amplitude $\Delta V1$ of the first downlink signal Rx1 received by the touch driving circuit TIC may be larger than the amplitude $\Delta V2$ of the second downlink signal Rx2 received by the touch driving circuit TIC.

This is because the ring 1300 is positioned farther away from the touch panel TSP than the tip 1020 due to the structure in which the ring 1300 is positioned inside the pen more than the tip 1020 and thereby the downlink signal output from the ring 1300 is more attenuated and received by the touch driving circuit TIC.

An amplitude difference $\Delta V1-\Delta V2$ between the first downlink signal Rx1 and the second downlink signal Rx2 received by the touch driving circuit TIC may be proportional to the gap L between the ring 1300 and the tip 1020.

As shown in FIG. 17, the first downlink signal Rx1 and the second downlink signal Rx2 received by the touch driving circuit TIC may have only the amplitude difference $\Delta V1-\Delta V2$ therebetween and may not have a phase difference therebetween.

As shown in FIG. 17, a case in which the first downlink signal Rx1 and the second downlink signal Rx2 received by the touch driving circuit TIC have only the amplitude difference $\Delta V1-\Delta V2$ without the phase difference may correspond to a case in which the tip 1020 and the ring 1300 of the pen 20 are driven in the time-division manner.

As shown in FIG. 18, the first downlink signal Rx1 and the second downlink signal Rx2 received by the touch driving circuit TIC may have a phase difference therebetween.

For example, the first downlink signal Rx1 and the second downlink signal Rx2 received by the touch driving circuit TIC may have a phase difference of 180 degrees.

As shown in FIG. 18, in a case in which the first downlink signal Rx1 and the second downlink signal Rx2 received by the touch driving circuit TIC have a phase difference therebetween, the first downlink signal Rx1 and the second downlink signal Rx2 may be easily distinguished from each other. Thereby, this case may correspond to a case in which the tip 1020 and the ring 1300 of the pen 20 are simultaneously driven.

Figure 19:
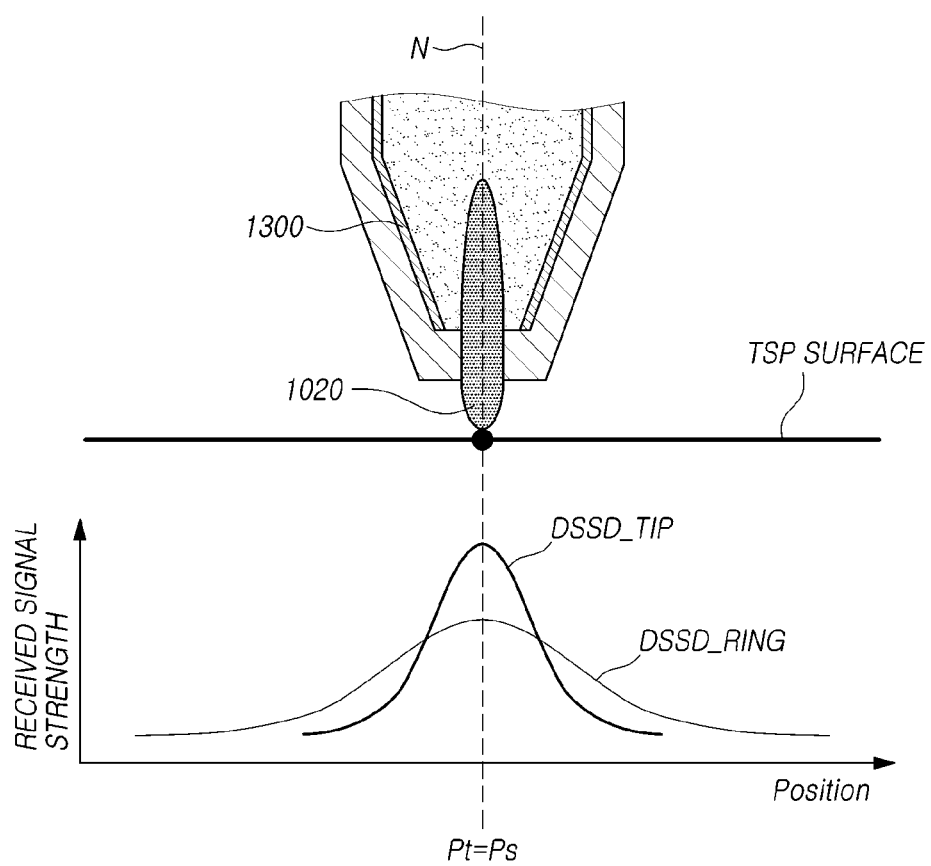
FIG. 19 is a diagram illustrating a distribution of received signal strength for each touch electrode with respect to a first downlink signal and a second downlink signal which are output from a pen according to aspects of the present disclosure, when the pen is used vertically.
Figure 20:
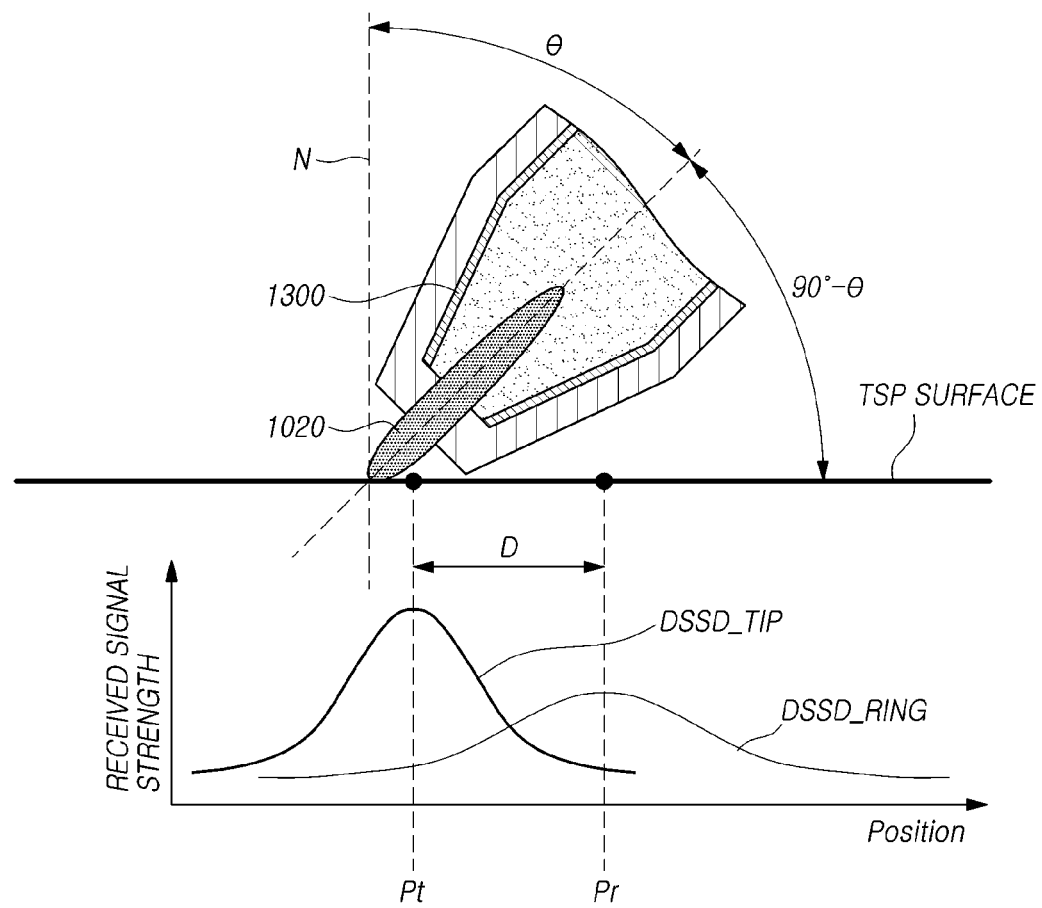
FIG. 20 is a diagram illustrating a distribution of received signal strength for each touch electrode with respect to a first downlink signal and a second downlink signal which are output from a pen according to aspects of the present disclosure, when the pen is used in a tilted manner.

FIGS. 19 and 20 are diagrams illustrating a received signal strength distribution of the tip DSSD_TIP for each touch electrode TE for a first downlink signal output from the tip 1020 of the pen 20 and a received signal strength distribution of the ring DSSD_RING for each touch electrode TE for a second downlink signal output from the ring 1300 of the pen 20, in cases in which the pen 20 according to the aspects of the present disclosure is vertically used or used in a tilted manner.

A touch system according to the aspects of the present disclosure may include the touch display device 10 and the pen 20.

The touch display device 10 may include a touch panel TSP configured to include a plurality of touch electrodes TE and a touch circuit 300 configured to supply an uplink signal to all or some of the plurality of touch electrodes TE and to receive a downlink signal through all or some of the touch electrodes TE.

The pen 20 may receive the uplink signal and may output the downlink signal.

The touch circuit 300 may receive a first downlink signal and a second downlink signal output from the pen 20, through all or some of the plurality of touch electrodes TE.

Here, the first downlink signal may be a downlink signal output from the tip 1020, and the second downlink signal may be a downlink signal output from the ring 1300.

The touch circuit 300 may receive the first downlink signal and the second downlink signal at different time zones or simultaneously.

Meanwhile, due to the gap L between the tip 1020 and the ring 1300, the first downlink signal and the second downlink signal arriving at the touch panel TSP may have a slight amplitude difference $\Delta V1$-$\Delta V2$.

The touch circuit 300 may sense the pen 20 based on the received signal strength for each touch electrode TE for the first downlink signal and the received signal strength for each touch electrode TE for the second downlink signal.

As shown in FIG. 19, when the pen 20 is vertically used, the touch electrode TE corresponding to a maximum value (maximum received signal strength) of the received signal strength for each touch electrode TE for the first downlink signal and the touch electrode TE corresponding to a maximum value (maximum received signal strength) of the received signal strength for each touch electrode TE for the second downlink signal may be the same touch electrode or the touch electrodes TE positioned significantly close to each other.

As shown in FIG. 20, when the pen 20 is tilted by a predetermined angle or more with respect to the surface of the touch panel TSP, the touch electrode TE corresponding to the maximum value (maximum received signal strength) of the received signal strength for each touch electrode TE for the first downlink signal and the touch electrode TE corresponding to the maximum value (maximum received signal strength) of the received signal strength for each touch electrode TE for the second downlink signal may be different from each other.

Meanwhile, the touch driving circuit TIC simultaneously receives the first downlink signals from one or two or more touch electrodes TE among the plurality of touch electrodes TE included in the touch panel TSP. The touch driving circuit TIC simultaneously receives the second downlink signals from one or two or more touch electrodes TE among the plurality of touch electrodes TE included in the touch panel TSP. The touch driving circuit TIC simultaneously receives the first downlink signal and the second downlink signal from one or two or more touch electrodes TE among the plurality of touch electrodes TE included in the touch panel TSP.

The touch driving circuit TIC generates and outputs first sensing data including a signal value of the first downlink signal received by one or two or more touch electrodes TE. The touch controller TCR may detect the received signal strength distribution DSSD_TIP for each touch electrode for the first downlink signal based on the first sensing data, and may calculate tip coordinates Pt from the detected received signal strength distribution DSSD_TIP.

Here, the tip coordinates Pt may correspond to the position of the touch electrode having the maximum value in the received signal strength distribution DSSD_TIP for each touch electrode for the first downlink signal.

The touch driving circuit TIC generates and outputs second sensing data including a signal value of the second downlink signal received by one or two or more touch electrodes IE. The touch controller TCR may detect the received signal strength distribution DSSD_RING for each touch electrode for the second downlink signal based on the second sensing data, and may calculate ring coordinates Pr from the detected received signal strength distribution DSSD_RING.

Here, the ring coordinates Pr may correspond to the position of the touch electrode having the maximum value in the received signal strength distribution DSSD_RING for each touch electrode for the second downlink signal.

As shown in FIG. 19, when the user uses the pen 20 vertically, the position corresponding to the maximum value in the received signal strength distribution DSSD_TIP for each touch electrode for the first downlink signal and the position corresponding to the maximum value in the received signal strength distribution DSSD_RING for each touch electrode for the second downlink signal may be the same or may be significantly close to each other. Accordingly, when the user uses the pen 20 vertically, the tip coordinates Pt and the ring coordinates Pr are the same or substantially the same.

As shown in FIG. 20, when the user uses the pen 20 in a tilted manner, the position corresponding to the maximum value in the received signal strength distribution DSSD_TIP for each touch electrode for the first downlink signal and the position corresponding to the maximum value in the received signal strength distribution DSSD_RING for each touch electrode for the second downlink signal may be different from each other. Therefore, when the user uses the pen 20 in the tilted manner, the tip coordinates Pt and the ring coordinates Pr may be different from each other.

As described above, from the received signal strength of each touch electrode TE for the first downlink signal output from the tip 1020 of the pen 20 and the received signal strength for each touch electrode TE for the second downlink signal output from the ring 1300 of the pen 20, a pen tilt condition may be accurately recognized and the pen 20 may more accurately sensed based on the recognized pen tilt condition.

Figure 21:
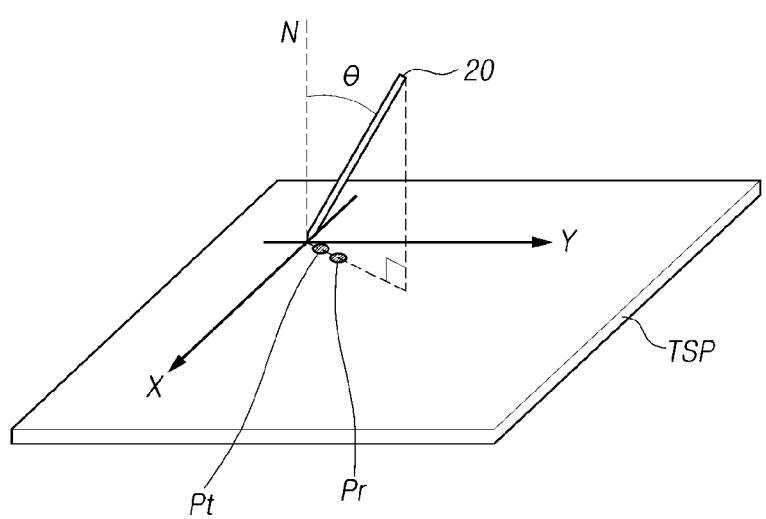
FIGS. 21 and 22 are diagrams illustrating tip coordinates and ring coordinates in accordance with a change in a pen tilt according to aspects of the present disclosure, and an environment for measuring a distance between the tip coordinates and the ring coordinates and the measurement results.
Figure 21:
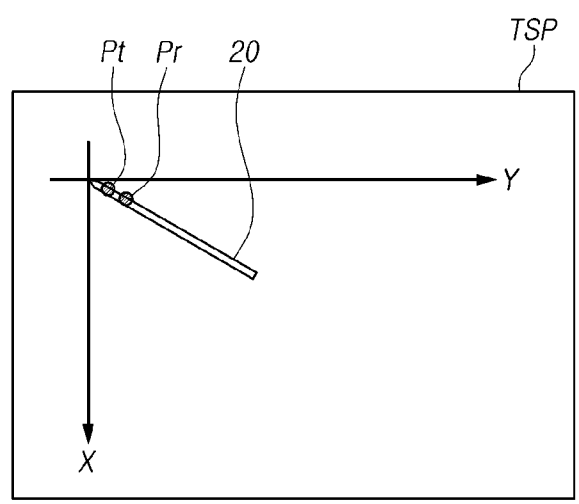
Figure 22:
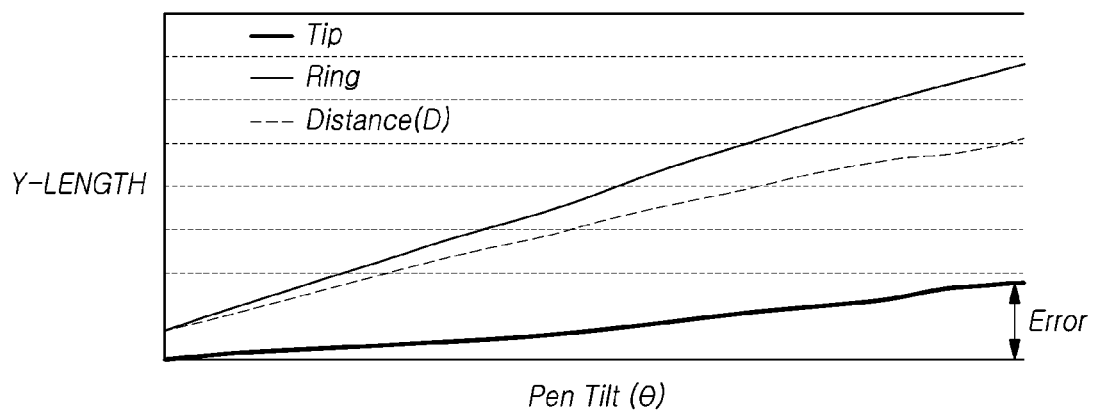

FIGS. 21 and 22 are diagrams illustrating tip coordinates Pt and ring coordinates Pr in accordance with a change in a pen tilt $\theta$ according to aspects of the present disclosure, and an environment for measuring a distance D between the tip coordinates Pt and the ring coordinates Pr and the measurement results.

As shown in FIG. 21, when the tip coordinates Pt and the ring coordinates Pr are measured while increasing the pen tilt $\theta$ corresponding to an angle formed by a normal line N of the touch panel TSP and the pen 20 and the distance D between the tip coordinates Pt and the ring coordinates Pr is measured, the same results as the graph of FIG. 22 may be obtained.

The graph of FIG. 22 is a graph showing a change in y-length (mm) according to a change in the pen tilt $\theta$. Here, when the surface of the touch panel TSP is referred to as an XY plane, the y-length is an amount of change in the y-value in a Y-axis direction and may indicate changes in the tip coordinates Pt, the ring coordinates Pr, and the distance D.

Referring to FIG. 22, the y-length value indicating an amount of change in the tip coordinates Pt may be increased along with an increase in the pen tilt $\theta$. The change in the tip coordinates Pt corresponds to a sensing error of the pen coordinates.

Meanwhile, referring to FIG. 22, the y-length value indicating an amount of change in the ring coordinates Pr is also increased along with an increase in the pen tilt θ. As a result, the y-length value indicating an amount of change in the distance D between the ring coordinates Pr and the tip coordinates Pt may also be increased.

However, the speed of the change in the ring coordinates Pr is faster than the speed of the change in the tip coordinates Pt along with the increase in the pen tilt θ.

Referring to FIG. 22, when the pen 20 is further tilted toward the surface of the touch panel TSP, that is, when the pen tilt θ is increased, both the tip coordinates Pt and the ring coordinates Pr may have a greater error than the actual pen position of the pen 20.

An error between the ring coordinates Pr and the actual pen position may be larger than an error between the tip coordinates Pt and the actual pen position. This may be due to the gap L between the ring 1300 and the tip 1020.

Referring to FIG. 22, the touch circuit 300 measures the tip coordinates Pt and the ring coordinates Pr and calculates a distance D between the tip coordinates Pt and the ring coordinates Pr from the measured tip coordinates Pt and ring coordinates Pr.

The touch circuit 300 may correct the tip coordinates Pt from the calculated distance D to finally determine the pen coordinates, considering that the error between the tip coordinates Pt and the actual pen position is increased along with an increase in the calculated distance D.

An amount of correction of the tip coordinates Pt may be proportional to the calculated distance D.

The touch circuit 300 may calculate the pen tilt θ from the measured tip coordinates Pt and ring coordinates Pr, may determine a correction direction of the tip coordinates Pt considering the calculated pen tilt θ, and may correct the tip coordinates Pt further considering the determined correction direction.

Figure 23:
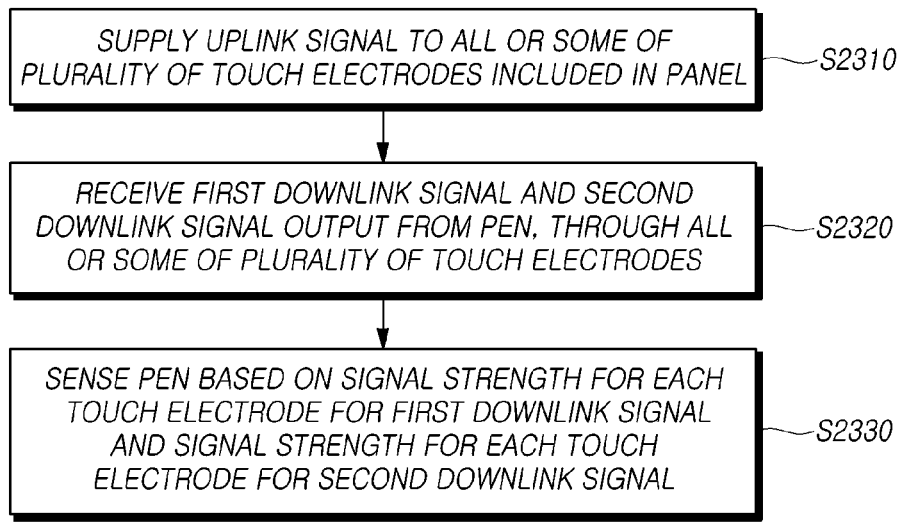
FIG. 23 is a flowchart illustrating a pen sensing method according to aspects of the present disclosure.
Figure 24:
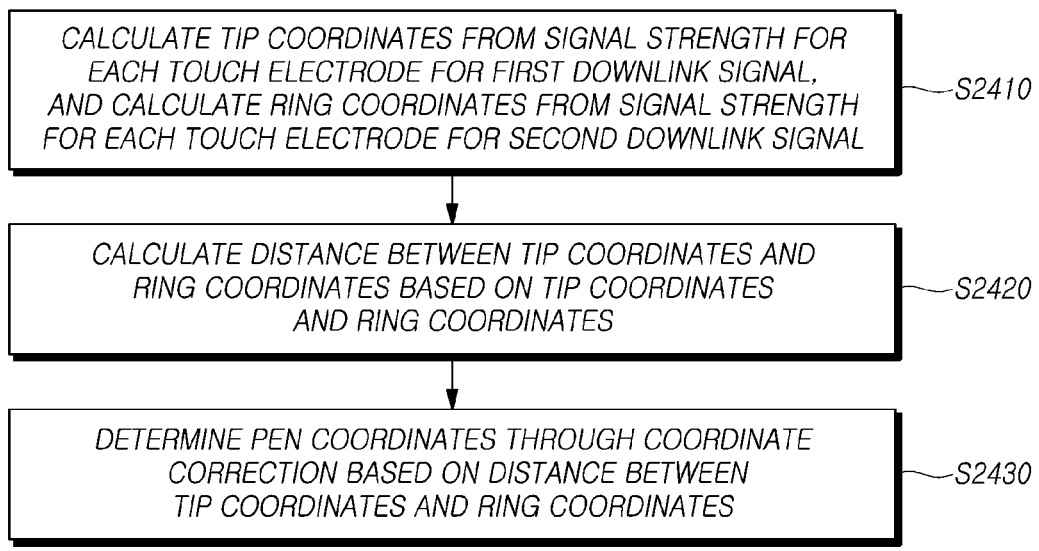
FIG. 24 is a flowchart illustrating a pen sensing operation in a pen sensing method according to aspects of the present disclosure.

FIG. 23 is a flowchart illustrating a pen sensing method according to aspects of the present disclosure, and FIG. 24 is a flowchart illustrating a pen sensing operation S2330 in a pen sensing method according to aspects of the present disclosure.

Referring to FIG. 23, the pen sensing method according to the aspects of the present disclosure may include operation S2310 of supplying, by the touch circuit 300, an uplink signal to all or some of a plurality of touch electrodes TE included in a touch panel TSP; operation S2320 of receiving, by the touch circuit 300, a first downlink signal and a second downlink signal output from the pen 20 through all or some of the plurality of touch electrodes TE; and operation S2330 of sensing, by the touch circuit 300, pen coordinates and/or a pen tilt of the pen 20 based on received signal strength for each touch electrode TE for the first downlink signal and received signal strength for each touch electrode TE for the second downlink signal.

The touch electrode TE receiving a maximum value of the received signal strength for each touch electrode TE for the first downlink signal and the touch electrode TE receiving a maximum value of the received signal strength for each touch electrode TE for the second downlink signal may be different from each other.

Using the above-described pen sensing method, the touch circuit 300 may accurately recognize a pen tilt condition from the received signal strength for each touch electrode TE for the first downlink signal output from the tip 1020 of the pen 20 and the received signal strength for each touch electrode TE for the second downlink signal output from the ring 1300 of the pen 20, thereby more accurately sensing the pen 20.

Meanwhile, in operation S2330, the touch circuit 300 may sense pen coordinates of the pen 20 based on the received signal strength for each touch electrode TE for the first downlink signal and the received signal strength for each touch electrode TE for the second downlink signal.

In addition, in operation 2330, the touch circuit 300 may sense a pen tilt θ for the pen 20 based on the received signal strength for each touch electrode TE for the first downlink signal and the received signal strength for each touch electrode TE for the second downlink signal.

The method of sensing the pen coordinates in operation S2330 described above will be described in more detail with reference to FIG. 24.

Referring to FIG. 24, operation S2330 may include operation S2410 of determining, by the touch circuit 300, tip coordinates Pt of the tip 1020 included in the pen 20 from the received signal strength for each touch electrode TE for the first downlink signal and determining, by the touch circuit 300, ring coordinates Pr of the ring 1300 included in the pen 20 from the received signal strength for each touch electrode TE for the second downlink signal; operation S2420 of calculating, by the touch circuit 300, a distance D between the tip coordinates Pt and the ring coordinates Pr; and operation S2430 of finally determining, by the touch circuit 300, pen coordinates of the pen 20 by correcting the tip coordinates Pt or the ring coordinates Pr based on the distance D between the tip coordinates Pt and the ring coordinates Pr.

As described above, the touch circuit 300 may obtain the tip coordinates Pt and the ring coordinates Pr by receiving the first downlink signal and the second downlink signal output from the tip 1020 and the ring 1300 of the pen 20, and may eliminate an error component due to the pen tilt θ through coordinate correction by utilizing the distance D between the tip coordinates Pt and the ring coordinates Pr, thereby more accurately sensing the pen coordinates.

Figure 25:
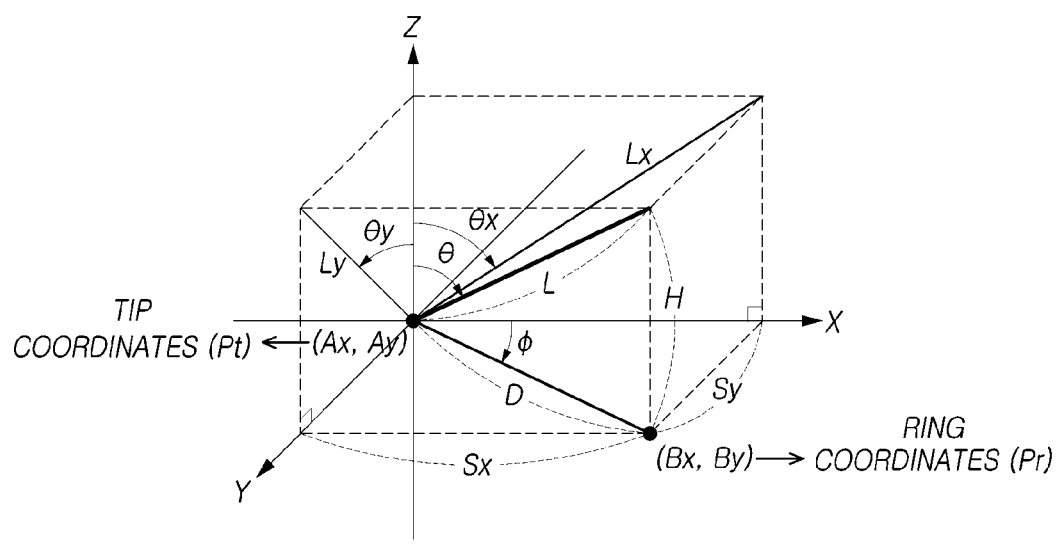
FIG. 25 is a diagram illustrating an example of a method of calculating a pen tilt and pen coordinates in accordance with a pen sensing method according to aspects of the present disclosure.

FIG. 25 is a diagram illustrating an example of a method of calculating a pen tilt θ and pen coordinates in accordance with a pen sensing method according to aspects of the present disclosure.

Referring to FIG. 25, the surface of the touch panel TSP is an XY plane composed of an X-axis and a Y-axis, and a Z-axis corresponds to a normal line N of the XY plane. It is assumed that the tip 1020 of the pen 20 contacts an origin (0, 0, 0) and the pen 20 is tilted by an angle θ.

Referring to FIG. 25, (Ax, Ay) is tip coordinates Pt and (Bx, By) is ring coordinates Pr. Sx corresponding to a X-axis coordinate value difference between the tip coordinates Pt and the ring coordinates Pr and Sy corresponding to a Y-axis coordinate value difference between the tip coordinates Pt and the ring coordinates Pr are calculated from the tip coordinates Pt and the ring coordinates Pr. Here, Sx and Sy may be influenced by a total number of touch electrodes TE arranged in a matrix form on the touch panel TSP, a size of one touch electrode TE, panel resolution, etc.

The difference D between the tip coordinates Pt and the ring coordinates Pr may be represented by Equation 1 below. In the following Equation 1, Sx denotes an X-axis coordinate value difference between the tip coordinates Pt and the ring coordinate Pr, and Sy denotes a Y-axis coordinate value difference between the tip coordinates Pt and the ring coordinate Pr.

$$D=\sqrt{Sx^2+Sy^2} \quad \text{[Equation 1]}$$

When the pen 20 is tilted, the pen tilt θ may be defined as an angle formed by the pen 20 and the Z-axis, which is the normal line N of the surface (XY plane) of the touch panel TSP.

The pen tilt θ may be calculated from arcsin(D/L) as shown in the following Equation 2. Here, D is a difference between the tip coordinates Pt and the ring coordinates Pr, and L is a gap between the tip 1020 and the ring 1300.

$$\theta = \arcsin\left(\frac{D}{L}\right) \quad \text{[Equation 2]}$$

An X-axis component θx and a Y-axis component θy of the pen tilt θ corresponding to the angle formed by the normal line N of the surface (XY plane) of the touch panel TSP and the pen 20 may be calculated from the following Equation 3.

$$\theta x = \arctan\left(\frac{Sx}{H}\right) \quad \text{[Equation 3]}$$
$$\theta y = \arctan\left(\frac{Sy}{H}\right)$$
$$H = L \times \cos(\theta)$$

In Equation 3, H may correspond to a height difference between the ring 1300 and the tip 1020 when the tip 1020 is in contact with the surface (XY plane) of the touch panel TSP. L is the distance between the tip 1020 and the ring 1300.

An azimuth Ø formed by orthogonal projection, in which the pen 20 is vertically lowered to the surface (XY plane) of the touch panel TSP, with the X-axis may be represented by the following Equation 4. In Equation 3, Sx is the X-axis coordinate value difference between the tip coordinates Pt and the ring coordinates Pr, and Sy is the Y-axis coordinate value difference between the tip coordinates Pt and the ring coordinates Pr.

$$\emptyset = \arctan\left(\frac{Sy}{Sx}\right) \quad \text{[Equation 4]}$$

For example, the pen coordinates may include the pen tilt θ corresponding to the angle formed by the normal line N of the surface (XY plane) of the touch panel TSP and the pen 20 and the azimuth Ø formed by the orthogonal projection, in which the pen 20 is vertically lowered to the surface (XY plane) of the touch panel TSP, with the X-axis. That is, the pen coordinates may be (θ, Ø).

By way of another example, the pen coordinates may include the X-axis component θx and the Y-axis component θy of the pen tilt θ corresponding to the angle formed by the normal line N of the surface (XY plane) of the touch panel TSP and the pen 20. That is, the pen coordinates may be (θx, θy).

One of two representations (θ, Ø) and (θx, θy) of the pen coordinates may be used in consideration of the coordinate system of the pen 20 or the touch display device 10.

Operation S2330 of FIG. 23 will be described below using the pen coordinate calculation method described above.

The touch circuit 300 may determine the tip coordinates Pt of the tip 1020 included in the pen 20 from the received signal strength for each touch electrode TE for the first downlink signal, and may determine the ring coordinates Pr of the ring 1300 included in the pen 20 from the received signal strength for each touch electrode TE for the second downlink signal.

The touch circuit 300 may calculate the distance D between the tip coordinates Pt and the ring coordinates Pr using Equation 1.

The touch circuit 300 may calculate the pen tilt θ based on the distance D between the tip coordinates Pt and the ring coordinates Pr and the distance L between the tip 1020 and the ring 1300 and the gap L between the tip 1020 and the ring 1300, using Equation 2.

The touch circuit 300 may determine the pen coordinates based on the pen tilt θ, the tip coordinates Pt, and the ring coordinates Pr.

For example, the pen coordinates may include the pen tilt θ corresponding to the angle formed by the normal line N of the surface (XY plane) of the touch panel TSP and the pen 20, and the azimuth Ø formed by the orthogonal projection, in which the pen 20 is vertically lowered to the surface (XY plane) of the touch panel TSP, with the X-axis. That is, the pen coordinates may be (θ, Ø).

By way of another example, the pen coordinates may include the X-axis component θx and the Y-axis component θy of the pen tilt θ corresponding to the angle formed by the normal line N of the surface (XY plane) of the touch panel TSP and the pen 20. That is, the pen coordinates may be (θx, θy).

As described above, the touch circuit 300 may accurately calculate the pen tilt θ, and may obtain accurate pen coordinates in which the error component due to the calculated pen tilt θ is eliminated.

Figure 26:
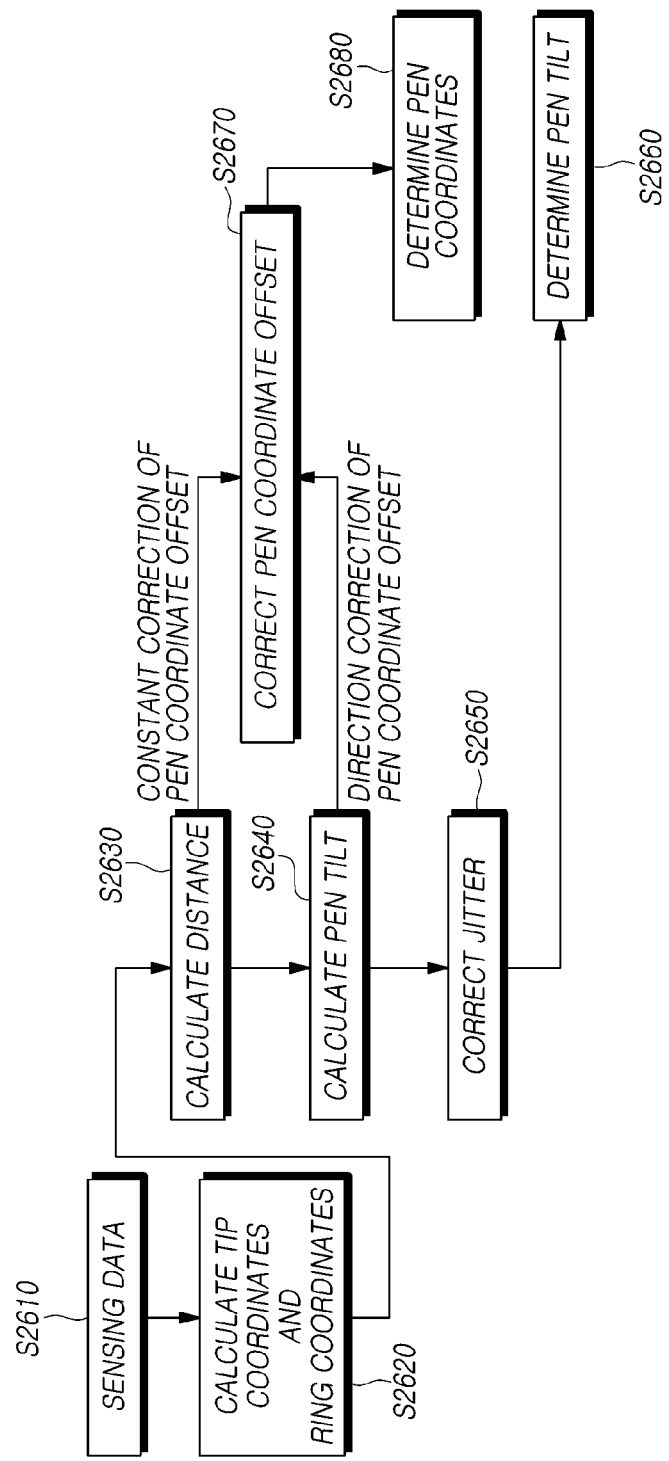
FIG. 26 is another flowchart illustrating a pen sensing method according to aspects of the present disclosure.

FIG. 26 is another flowchart illustrating a pen 20 sensing method according to aspects of the present disclosure.

In operation 2610, the touch driving circuit TIC may generate first sensing data including the received signal strength for each touch electrode TE for the first downlink signal and second sensing data including the received signal strength for each touch electrode TE for the second downlink signal, and may transmit the generated data to the touch controller TCR.

In operation S2620, the touch controller TCR may calculate the tip coordinates Pt using the first sensing data, and may calculate the ring coordinates Pr using the second sensing data.

In operation S2620, the touch controller TCR may determine the tip coordinates Pt of the tip 1020 included in the pen 20 from the received signal strength for each touch electrode IL for the first downlink signal using the first sensing data, and may determine the ring coordinates Pr of the ring 1300 included in the pen 20 from the received signal strength for each touch electrode TE for the second downlink signal using the second sensing data.

In operation S2630, the touch controller TCR may calculate the distance D between the tip coordinates Pt and the ring coordinates Pr based on the tip coordinates Pt and the ring coordinates Pr.

In operation 2640, the touch controller TCR may calculate the pen tilt θ of the pen 20 based on the distance D between the tip coordinates Pt and the ring coordinates Pr.

The touch controller TCR may correct a jitter such as signal delay in operation S2650, and may finally determine the pen tilt θ in operation S2660.

In operation S2670, the touch controller TCR may calculate a constant correction value of pen coordinate offset based on the distance D between the tip coordinates Pt and the ring coordinates Pr, and may calculate a direction correction value of the pen coordinate offset based on the pen tilt θ, thereby correcting the pen coordinate offset.

Here, the pen coordinate offset may be information that compensates for an error between an actual pen position and a sensed pen position (tip coordinates Pt). The constant correction value of the pen coordinate offset may correspond to the distance between the actual pen position and the sensed pen position (tip coordinates Pt). The direction correction value of the pen coordinate offset may correspond to a direction from the sensed pen position (tip coordinates Pt) to the actual pen position.

In operation S2680, the touch controller TCR may finally determine the pen coordinates based on the tip coordinates Pt or the ring coordinates Pr, the constant correction value of the pen coordinate offset, and the direction correction value.

For example, the touch controller TCR may finally determine the pen coordinates by shifting the pen coordinates by the constant correction value in a direction corresponding to the direction correction value in the tip coordinates Pt.

Using the above-described pen sensing method, it is possible to obtain more accurate pen coordinates through the coordinate correction according to the inclination of the pen 20.

Figure 27:
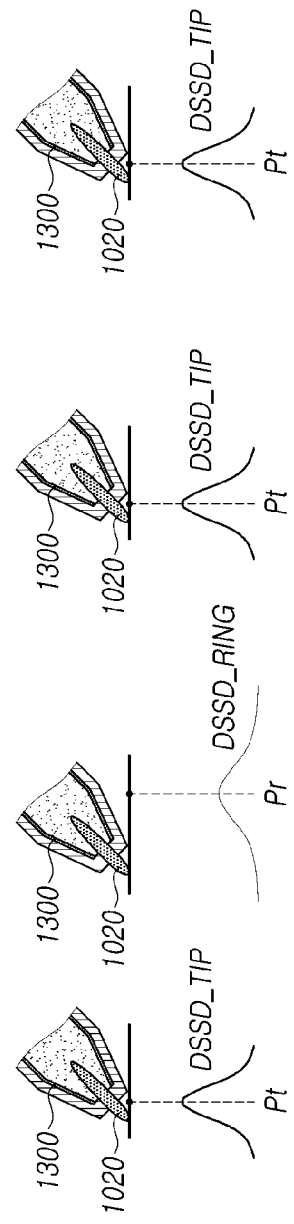
FIG. 27 is a diagram illustrating a driving timing for a touch driving operation between a touch display device and a pen according to aspects of the present disclosure, when a tip and a ring of the pen are driven in a time-division manner.
Figure 28:
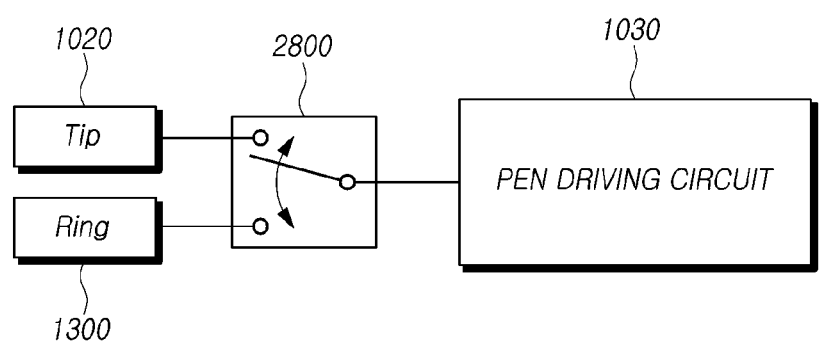
FIG. 28 is a diagram illustrating an example of a switching structure for each of a tip and a ring of a pen according to aspects of the present disclosure, when the tip and the ring are driven in a time-division manner.

FIG. 27 is a diagram illustrating a driving timing for a touch driving operation between the touch display device 10 and the pen 20 according to aspects of the present disclosure, when the tip 1020 and the ring 1300 of the pen 20 are driven in the time-division manner, and FIG. 28 is a diagram illustrating an example of a switching structure for each of the tip 1020 and the ring 1300 of a pen 20 according to aspects of the present disclosure, when the tip 1020 and the ring 1300 are driven in the time-division manner.

The pen driving circuit 1030 may drive the tip 1020 and the ring 1300 in a time-division manner.

The pen driving circuit 1030 may output a downlink signal through the tip 1020 during a tip driving period, and then may output a downlink signal through the ring 1300 during a ring driving period.

According to the example of FIG. 27, the tip driving period may be a touch driving period T2, T9, or T13 for sensing pen coordinates, and at this time, the tip coordinates Pt may be calculated. The ring driving period may be a touch driving period T5 for sensing a pen tilt, and at this time, the ring coordinates Pr may be calculated.

The touch circuit 300 may obtain the tip coordinates Pt based on the first downlink signal output from the tip 1020 during the tip driving periods T2, T9, and T13.

The touch circuit 300 may obtain the ring coordinates Pr based on the second downlink signal output from the ring 1300 during the ring driving period T5.

The touch circuit 300 may calculate the difference D between the tip coordinates Pt and the ring coordinates Pr using the tip coordinates Pt and the ring coordinates Pr during the ring driving period T5, and the pen tilt may be calculated.

In addition, the touch circuit 300 may perform pen coordinate correction in pen coordinate sensing periods T9 and T13 using the difference D between the tip coordinates Pt and the ring coordinates Pr.

As described above, when the tip 1020 and the ring 1300 in the pen 20 are driven in the time-division manner, the first downlink signal and the second downlink signal may be output from the pen 20 in different periods. That is, the first downlink signal may be output from the tip 1020 during the touch driving periods T2, T9, and T13 corresponding to the tip driving period, and the second downlink signal may be output from the ring 1300 during the touch driving period T5 corresponding to the ring driving period.

When the tip 1020 and the ring 1300 are driven by the pen 20 in the time-division manner, since the touch circuit 300 receives the first downlink signal and the second downlink signal at different time zones, the downlink signal and the second downlink signal are not necessarily distinguished from each other. Therefore, the pen driving circuit 1030 of the pen 20 may provide the same downlink signal to the tip 1020 and the ring 1300 at different time zones. That is, the pen driving circuit 1030 does not need to separately generate the first downlink signal to be output through the tip 1020 and the second downlink signal to be output through the ring 1300.

In this manner, the pen 20 may include a first switch circuit 2800 to control the driving timing of the tip 1020 and the ring 1300 and control the transmission of the downlink signal to the tip 1020 and the ring 1300.

Referring to FIG. 28, the first switch circuit 2800 may electrically connect the tip 1020 to the pen driving circuit 1030 at first timings T2, T9, and T13 corresponding to the tip driving period, and may electrically connect the ring 1300 to the pen driving circuit 1030 at a second timing T5 which is different from the first timings T2, T9, and T13 and corresponds to the ring driving period.

Using the above-described first switch circuit 2800, the tip 1020 and the ring 1300 of the pen 20 may be effectively driven in the time-division manner.

Figure 29:
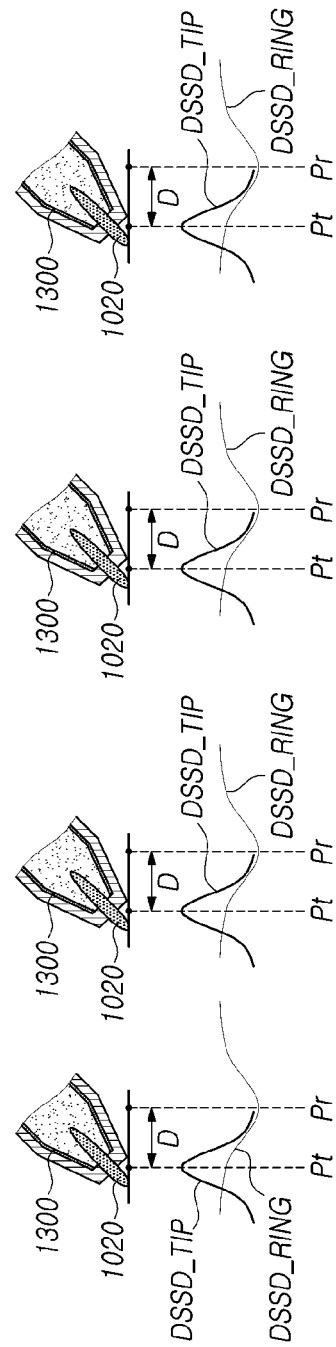
FIG. 29 is a diagram illustrating a driving timing for a touch driving operation between a touch display device and a pen according to aspects of the present disclosure, when a tip and a ring of the pen are simultaneously driven.
Figure 30:
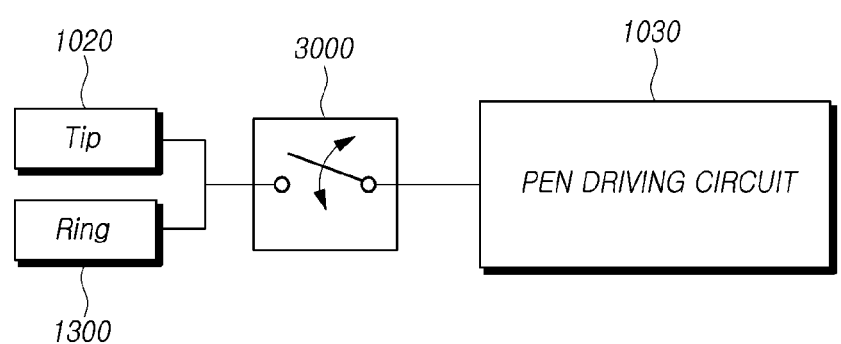
FIG. 30 is a diagram illustrating an example of a switching structure for each of a tip and a ring of a pen according to aspects of the present disclosure, when the tip and the ring of the pen are simultaneously driven.

FIG. 29 is a diagram illustrating a driving timing for a touch driving operation between the touch display device 10 and the pen 20 according to aspects of the present disclosure, when the tip 1020 and the ring 1300 of the pen 20 are simultaneously driven, and FIG. 30 is a diagram illustrating an example of a switching structure for each of the tip 1020 and the ring 1300 of the pen 20 according to aspects of the present disclosure, when the tip 1020 and the ring 1300 of the pen 20 are simultaneously driven.

The pen driving circuit 1030 may drive the tip 1020 and the ring 1300 at the same time.

The pen driving circuit 1030 may output the first downlink signal and the second downlink signal through the tip 1020 and the ring 1300 during the touch driving periods T2, T5, T9, and T13 corresponding to the tip and signal driving periods.

Since the first downlink signal and the second downlink signal are output simultaneously through the tip 1020 and the ring 1300, respectively, the first downlink signal output from the tip 1020 and the second downlink signal output from the ring 1300 should be distinguishable from each other.

Therefore, the first downlink signal output from the tip 1020 and the second downlink signal output from the ring 1300 may have different phases. That is, the first downlink signal output from the tip 1020 and the second downlink signal output from the ring 1300 may have a phase difference (e.g., a phase difference of 180 degrees).

The touch driving periods T2, T5, T9, and T13 corresponding to the tip and ring driving periods are periods for sensing the pen coordinates and the pen tilt together.

Accordingly, the tip coordinates Pt and the ring coordinates Pr may be calculated together during the touch driving periods T2, T5, T9, and T13 corresponding to the tip and ring driving periods.

The touch circuit 300 may calculate the difference D between the tip coordinates Pt and the ring coordinates Pr by using the tip coordinates Pt and the ring coordinates Pr calculated together during the touch driving periods T2, T5, T9 and T13 corresponding to the tip and ring driving periods, and the pen tilt may be calculated.

The touch circuit 300 may perform pen coordinate correction in the pen coordinate sensing periods T9 and T13 using the difference D between the tip coordinates Pt and the ring coordinates Pr.

As described above, when the tip 1020 and the ring 1300 are simultaneously driven in the pen 20, the first downlink signal and the second downlink signal may be output from the pen 20 during the same periods T2, T5, T9, and T13. That is, the first downlink signal and the second downlink signal may be simultaneously output from the tip 1020 and the ring 1300 during the touch driving periods T2, T5, T9, and T13 corresponding to the tip and ring driving periods.

In this manner, when the pen 20 simultaneously drives the tip 1020 and the ring 1300, the touch circuit 300 may receive the first downlink signal and the second downlink signal at the same time zone to sense the pen coordinates and the pen tilt together, thereby enabling faster pen sensing.

In this manner, in order to control the driving timing of the tip 1020 and the ring 1300 and control the transmission of the downlink signal to the tip 1020 and the ring 1300, the pen 20 may include a second switch circuit 3000.

Referring to FIG. 30, the second switch circuit 3000 may electrically connect the tip 1020 and the ring 1300 to the pen driving circuit 1030 at the same time during the touch driving periods T2, T5, T9, and T13 corresponding to the tip and ring driving periods.

Using the above-described second switch circuit 3000, the tip 1020 and the ring 1300 of the pen 20 may be effectively driven simultaneously.

According to the example of FIG. 27, during 16 touch driving periods T1 to T16 corresponding to one touch frame period, the pen coordinates may be sensed three times during the three touch driving periods T2, T9, and T13, and the pen tilt may be sensed once during one touch driving period T5.

Accordingly, assuming that the 16 touch driving periods T1 to T16 correspond to one display frame period and a display driving frequency is 60 Hz, a driving frequency for sensing the pen coordinates is 180 Hz(=3*60 Hz), and a driving frequency for sensing the pen tilt is 60 Hz.

According to the example of FIG. 29, during the 16 touch driving periods T1 to T16 corresponding to one touch frame period, the pen coordinates may be sensed four times during the four touch driving periods T2, T5, T9 and T13, and the pen tilt may be sensed four times.

Accordingly, assuming that the 16 touch driving periods T1 to T16 correspond to one display frame period and the display driving frequency is 60 Hz, the driving frequency for sensing the pen coordinates is 240 Hz(=4*60 Hz), and the driving frequency for sensing the pen tilt is also 240 Hz(=4*60 Hz).

As shown in FIG. 29, when the first downlink signal and the second downlink signal are simultaneously output from the pen 20 (i.e., when the pen coordinates and the pen tilt are sensed simultaneously or when the tip 1020 and the ring 1300 are driven simultaneously), the driving frequency for sensing the pen coordinates is the same as the driving frequency for sensing the pen tilt θ.

As shown in FIG. 27, when the first downlink signal and the second downlink signal are output in different periods in the pen 20 (i.e., when the pen coordinates and the pen tilt are sensed in a time-division manner or when the tip 1020 and the ring 1300 are driven in a time-division manner), the driving frequency for sensing the pen coordinates and the driving frequency for sensing the pen tilt may be the same or different from each other, depending on the number of the tip driving periods and the ring driving periods.

Meanwhile, referring to FIGS. 27 and 29 together with FIG. 9, during first periods (T2, T5, T9, T13; T3, T6, T7, T14, T15) during which the first downlink signal and the second downlink signal are output from the pen 20, a DC voltage may be applied to one or more of the plurality of touch electrodes TE.

Here, the first periods may include touch driving periods T2, T5, T9, and T13 for sensing the pen coordinates and/or the pen tilt and touch driving periods T3, T6, T7, T14, and T15 for sensing data including pen additional information.

As described above, during the first periods T2, T5, T9, T13, T3, T6, T7, T14, and T15 during which the downlink signal output from the pen 20 is applied to the touch panel TSP, a DC voltage may be applied to the touch panel TSP, and thereby the touch circuit 300 may more accurately recognize the downlink signal output to the pen 20.

Referring to FIGS. 27 and 29 together with FIG. 9, during second periods (T4, T8, T10, T11, T12, T16) different from the first periods (T2, T5, T9, T13; T3, T6, T7, T14, T15) during which the first downlink signal and the second downlink signal are output from the pen 20, a modulated signal may be applied to one or more of the plurality of touch electrodes TE.

Here, the modulated signal whose voltage level is variable may be a touch driving signal TDS for sensing a touch by a finger, as shown in FIG. 9.

The touch circuit 300 may sense the touch by the finger based on the signal received through one or more touch electrodes TE in response to the modulated signal TDS whose voltage level is variable, during the second periods T4, T8, T10, T11, T12, and T16.

As described above, during the second periods (T4, T8, T10, T11, T12, T16) different from the first periods (T2, T5, T9, T13; T3, T6, T7, T14, T15) during which the downlink signal output from the pen 20 is applied to the touch panel TSP, the modulated signal whose voltage level is variable may be applied to the touch panel TSP, and thereby the touch circuit 300 may sense the touch by the finger.

Figure 31:
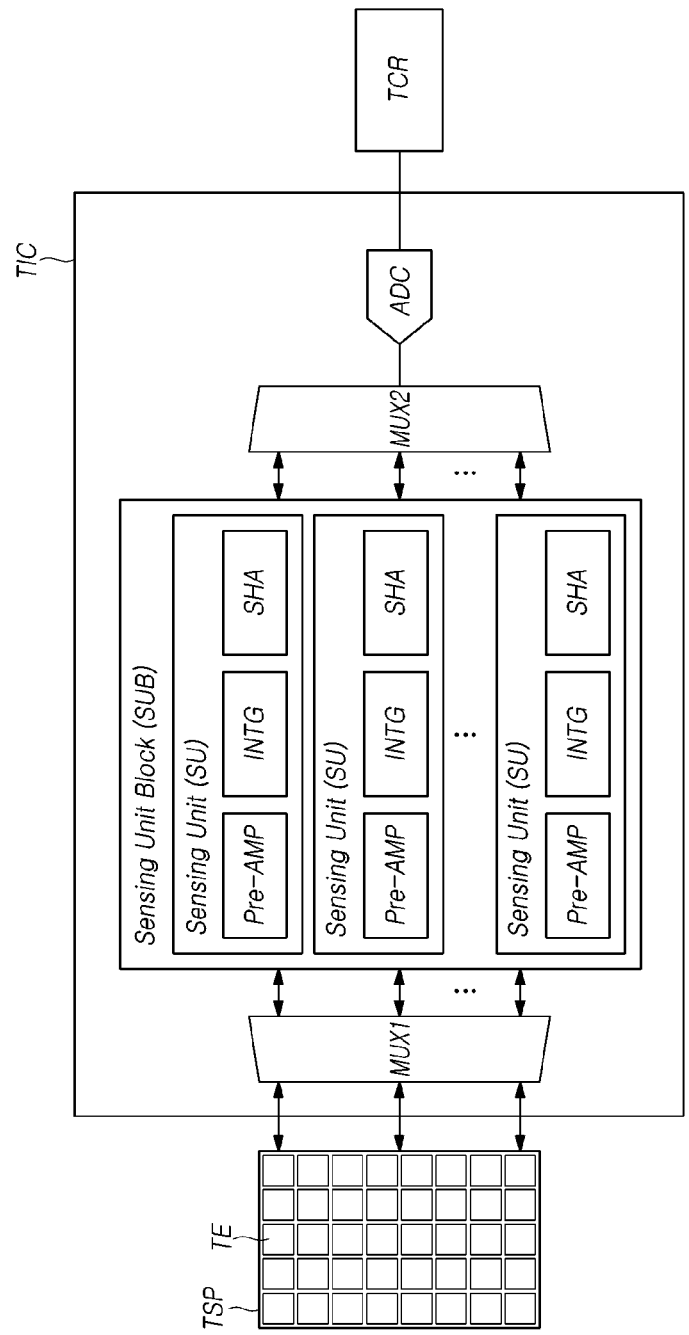
FIG. 31 is a diagram illustrating an example of a touch driving circuit according to aspects of the present disclosure.

FIG. 31 is a diagram illustrating an example of a touch driving circuit TIC according to aspects of the present disclosure.

Referring to FIG. 31, the touch driving circuit TIC according to the aspects of the present disclosure may include a first multiplexer circuit MUX1, a sensing unit block SUB including a plurality of sensing units SU, a second multiplexer circuit MUX2, an analog-to-digital converter (ADC), and the like.

The first multiplexer circuit MUX1 may include one or two or more multiplexers. The second multiplexer circuit MUX2 may include one or two or more multiplexers.

Each sensing unit SU may include a pre-amplifier pre-AMP, an integrator INTG, and a sample and hold circuit SHA.

The pre-amplifier pre-AMP may be electrically connected to one or two or more touch electrodes TE by the first multiplexer circuit MUX1.

The pre-amplifier pre-AMP may supply a touch driving signal to one or two or more touch electrodes TE connected by the first multiplexer circuit MUX1.

The pre-amplifier pre-AMP may receive a sensing signal from one touch electrode TE to be sensed among one or two or more touch electrodes TE connectable by the first multiplexer circuit MUX1. Here, the sensing signal may be a sensing signal for sensing a touch by a finger or a downlink signal output from the pen 20.

The integrator INTG integrates a signal output from the pre-amplifier pre-AMP. The integrator INTG may be integrated into the pre-amplifier pre-AMP and implemented.

The analog-to-digital converter ADC may output sensing data obtained by converting an integral value output to the integrator INTG into a digital value, to the touch controller TCR.

Here, the sensing data may be sensing data for sensing the touch by the finger, or sensing data for sensing a touch by the pen 20 or pen additional information.

Figure 32:
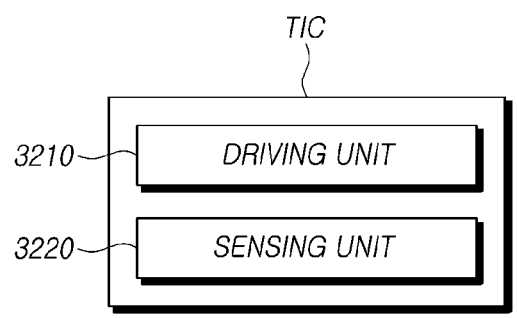
FIG. 32 is a block diagram illustrating a touch driving circuit according to aspects of the present disclosure.

FIG. 32 is a block diagram illustrating a touch driving circuit TIC according to aspects of the present disclosure.

Referring to FIG. 32, a touch driver circuit TIC according to the aspects of the present disclosure may include a driving unit 3210 configured to supply an uplink signal to all or some of a plurality of touch electrodes TE included in a touch panel TSP, a sensing unit 3220 configured to generate and output sensing data when a first downlink signal and a second downlink signal output from the pen 20 are received through all or some of the plurality of touch electrodes TE.

The driving unit 3210 may include the pre-amplifier pre-AMP of FIG. 31.

The sensing unit 3220 may include the integrator INTG, the sample and hold circuit SHA, and the analog-to-digital converter ADC of FIG. 31.

When the pen 20 is vertically used, the touch electrode TE receiving a maximum value of received signal strength for each touch electrode TE for the first downlink signal and the touch electrode TE receiving a maximum value of received signal strength for each touch electrode TE for the second downlink signal may be the same or may be adjacent touch electrodes.

When the pen 20 is tilted by a predetermined angle or more with respect to the surface of the touch panel TSP, the touch electrode TE receiving the maximum value of the received signal strength for each touch electrode TE for the first downlink signal and the touch electrode TE receiving the maximum value of the received signal strength for each touch electrode TE for the second downlink signal may be different from each other.

Amplitudes of the first downlink signal and the second downlink signal at an output point of each of the tip 1020 and the ring 1300 of the pen 20 may be the same.

However, at a point where the touch driving circuit TIC receives the first downlink signal and the second downlink signal, the first downlink signal and the second downlink signal may have different amplitudes. This is because a distance between the ring 1300 and the touch panel TSO is longer than a distance between the tip 1020 and the touch panel TSP.

Meanwhile, the first downlink signal and the second downlink signal output from the tip 1020 and the ring 1300 of the pen 20 may have no phase difference.

The first downlink signal and the second downlink signal output from the tip 1020 and the ring 1300 of the pen 20 and received by the touch driving circuit TIC may have a phase difference.

When the tip 1020 and the ring 1300 in the pen 20 are driven in a time-division manner, the first downlink signal and the second downlink signal may be output from the pen 20 in different periods (touch driving periods).

Unlike this, when the tip 1020 and the ring 1300 are simultaneously driven in the pen 20, the first downlink signal and the second downlink signal may be output from the pen 20 in the same period (touch drive period).

According to the aspects of the present disclosure described above, even if the user uses the pen 20 in a tilted manner, the pen 20 may be accurately sensed.

In addition, according to the aspects of the present disclosure, there is provided the pen 20 having two signal transmission media (the tip 1020 and the ring 1300) and the pen tilt may be more accurately sensed through this pen 20.

In addition, according to the aspects of the present disclosure, accurate pen coordinates may be sensed by correcting a coordinate error due to the pen tilt.

In addition, according to the aspects of the present disclosure, the pen 20 may be efficiently sensed by driving the two signal transmission media (the tip 1020 and the ring 1300) of the pen 20 in a time-division manner.

In addition, according to the aspects of the present disclosure, the pen 20 may be quickly sensed by simultaneously driving the two signal transmission media (the tip 1020 and the ring 1300) of the pen 20.

The above description and the accompanying drawings are merely provided as an example of the technical idea of the present disclosure, and those having ordinary knowledge in the technical field to which the present disclosure pertains will appreciate that various modifications and changes in form, such as combination, separation, substitution, and change of a configuration, may be made to the aspects described herein without departing from the essential features of the present disclosure. Therefore, the aspects disclosed in the present disclosure are intended not to limit but to describe the technical idea of the present disclosure, and thus do not limit the scope of the technical idea of the present disclosure. The scope of the present disclosure should be construed based on the appended claims, and all of the technical ideas included within the scope equivalent to the appended claims should be construed as being included within the scope of the present disclosure.

What is claimed is:

1. A touch driving circuit comprising:
   a driving unit configured to supply an uplink signal to more than one of a plurality of touch electrodes included in a touch panel; and
   a sensing unit configured to generate and output sensing data when a first downlink signal output from a tip of a pen and a second downlink signal output from a ring of the pen are received through the more than one of the plurality of touch electrodes,
   wherein, when the pen is tilted to reach a predetermined angle with respect to a surface of the touch panel, the touch electrode receiving a maximum value of received signal strength for each touch electrode for the first downlink signal and the touch electrode receiving a maximum value of received signal strength for each touch electrode for the second downlink signal are different from each other,
   wherein the driving unit configured to supply the uplink signal and the sensing unit configured to generate and output the sensing data are performed during one or more touch driving periods in a driving timing,
   wherein the one or more touch driving periods for touch driving and one or more display driving periods for display driving are alternately assigned in a time-division manner or independently defined in an independent manner, and
   wherein, when the touch display device is driven in the time-division manner, the one or more touch driving periods are blank periods during which the display driving is not performed, and when the touch display device is driven in the independent manner, the display driving and the touch driving are simultaneously performed.

2. The touch driving circuit of claim 1, wherein each of the first downlink signal and the second downlink signal is a modulated signal having a variable voltage level.

3. The touch driving circuit of claim 1, wherein the first downlink signal and the second downlink signal have different amplitudes.

4. The touch driving circuit of claim 1, wherein the first downlink signal and the second downlink signal have a difference in phase.

5. The touch driving circuit of claim 1, wherein the first downlink signal and the second downlink signal are output from the pen during different periods.

6. The touch driving circuit of claim 1, wherein the first downlink signal and the second downlink signal are output from the pen during the same period.

7. A touch display device comprising:
a touch panel including a plurality of touch electrodes; and
a touch circuit including one or more touch driving circuits supplying a touch driving signal to the touch panel and receiving a touch sensing signal from the touch panel,
wherein the one or more touch driving circuit includes:
a driving unit supplying an uplink signal to more than one of a plurality of touch electrodes included in a touch panel; and
a sensing unit generating and outputting sensing data when a first downlink signal output from a tip of a pen and a second downlink signal output from a ring of the pen are received through the more than one of the plurality of touch electrodes,
wherein, when the pen is tilted to reach a predetermined angle with respect to a surface of the touch panel, the touch electrode receiving a maximum value of received signal strength for each touch electrode for the first downlink signal and the touch electrode receiving a maximum value of received signal strength for each touch electrode for the second downlink signal are different from each other,
wherein the one or more touch driving circuits supplying the touch driving signal and the receiving a touch sensing signal are performed during one or more touch driving periods in a driving timing,
wherein the one or more touch driving periods for touch driving and one or more display driving periods for display driving are alternately assigned in a time-division manner or independently defined in an independent manner, and
wherein, when the touch display device is driven in the time-division manner, the one or more touch driving periods are blank periods during which the display driving is not performed, or when the touch display device is driven in the independent manner, the display driving and the touch driving are simultaneously performed.

8. The touch display device of claim 7, wherein one or more touch electrode of the plurality of touch electrodes receives a DC voltage during a first period during which the first downlink signal and the second downlink signal are output from the pen.

9. The touch display device of claim 7, wherein one or more touch electrode of the plurality of touch electrodes receives a modulated signal during a second period different from the first period during which the first downlink signal and the second downlink signal are output from the pen.

10. The touch display device of claim 9, wherein the touch circuit senses a touch by a finger based on a signal received through the one or more touch electrode in response to the modulated signal, during the second period.

11. The touch display device of claim 1, wherein the touch circuit senses the pen coordinates based on the received signal strength for each touch electrode for the first downlink signal and the received signal strength for each touch electrode for the second downlink signal, and senses the pen tilt based on the received signal strength for each touch electrode for the first downlink signal and the received signal strength for each touch electrode for the second downlink signal.

12. The touch display device of claim 11, wherein a driving frequency for sensing the pen coordinates is different from a driving frequency for sensing the pen tilt.

13. The touch display device of claim 11, wherein the driving frequency for sensing the pen coordinates is the same as the driving frequency for sensing the pen tilt.

14. The touch display device of claim 11, wherein the pen coordinates includes an X-axis component and a Y-axis component of an angle formed by a normal line of the surface and the pen when a surface of the touch panel is a plane composed of an X-axis and a Y-axis.

15. The touch display device of claim 11, wherein, when a surface of the touch panel is a plane composed of an X-axis and a Y-axis, the pen coordinates includes an angle formed by a normal line of the surface and the pen and an azimuth formed by orthogonal projection, in which the pen is vertically lowered to the surface, with respect to the X-axis.

16. A pen comprising:
a housing;
a tip protruding to an outside of the housing;
a ring provided inside the housing and having a shape enclosing an inner side surface of the housing; and
a pen driving circuit provided inside the housing, electrically connected to one or more of the tip and the ring, and to output a downlink signal through the one or more of the tip and the ring connection to a touch display device,
wherein the pen driving circuit drives the tip and the ring during one or more touch driving periods in a driving timing,
wherein the one or more touch driving periods for touch driving and one or more display driving periods for display driving are alternately assigned in a time-division manner or independently defined in an independent manner, and
wherein, when the touch display device is driven in the time-division manner, the one or more touch driving periods are blank periods during which the display driving is not performed, or when the touch display device is driven in the independent manner, the display driving and the touch driving are simultaneously performed.

17. The pen of claim 16, further comprising a first switch circuit electrically connecting the tip and the pen driving circuit at a first timing when the tip and the ring are driven in the time-division manner and electrically connecting the ring and the pen driving circuit at a second timing, which is different from the first timing.

18. The pen of claim 16, further comprising a second switch circuit electrically connecting the tip and the ring with the pen driving circuit simultaneously when the tip and the ring are driven simultaneously.

19. A pen sensing method comprising:
supplying an uplink signal to one or more touch electrode of a plurality of touch electrodes included in a touch display device;
receiving a first downlink signal and a second downlink signal output from a pen through the one or more touch electrode of the plurality of touch electrodes; and
sensing pen coordinates and/or a pen tilt of the pen based on received signal strength for each touch electrode for the first downlink signal and received signal strength for each touch electrode for the second downlink signal,
wherein the first downlink signal and the second downlink signal are received during different periods or during the same period,
wherein the supplying the uplink signal and the receiving the first and second downlink signals are performed during one or more touch driving periods in a driving timing,
wherein the one or more touch driving periods for touch driving and one or more display driving periods for display driving are alternately assigned in a time-division manner or independently defined in an independent manner, and
wherein, when the touch display device is driven in the time-division manner, the one or more touch driving periods are blank periods during which the display driving is not performed, or when the touch display device is driven in an independent manner, the display driving and the touch driving are simultaneously performed.

20. The pen sensing method of claim 19, wherein the sensing pen coordinates and/or the pen tilt of the pen includes:
determining tip coordinates of a tip included in the pen from the received signal strength for each touch electrode for the first downlink signal and determining ring coordinates of a ring included in the pen from the received signal strength for each touch electrode for the second downlink signal,
calculating a distance between the tip coordinates and the ring coordinates, and
determining the pen coordinates by correcting the tip coordinates or the ring coordinates based on the distance between the tip coordinates and the ring coordinates.

21. The pen sensing method of claim 19, wherein the sensing pen coordinates and/or the pen tilt of the pen includes:
determining tip coordinates of a tip included in the pen from the received signal strength for each touch electrode for the first downlink signal and determining ring coordinates of a ring included in the pen from the received signal strength for each touch electrode for the second downlink signal,
calculating a distance between the tip coordinates and the ring coordinates based on the tip coordinates and the ring coordinates,
calculating a pen tilt for the pen based on the distance,
calculating a constant correction value of pen coordinate offset based on the distance, and calculating a direction correction value of the pen coordinate offset based on the pen tilt, and
determining the pen coordinates based on the tip coordinates or the ring coordinates, the constant correction value of the pen coordinate offset, and the direction correction value.

22. A touch system comprising:
a touch display device including a touch panel having a plurality of touch electrodes, and a touch circuit for supplying an uplink signal to one or more touch electrode of the plurality of touch electrodes and receiving a downlink signal through the one or more touch electrode of the plurality of touch electrodes; and
a pen receiving the uplink signal and outputting the downlink signal,
wherein the touch circuit receives a first downlink signal and a second downlink signal output from the pen through the one or more touch electrode of the plurality of touch electrodes, and
senses the pen based on received signal strength for each touch electrode for the first downlink signal and received signal strength for each touch electrode for the second downlink signal, and
when the pen is tilted to reach a predetermined angle with respect to a surface of the touch panel, the touch electrode receiving a maximum value of received signal strength for each touch electrode for the first downlink signal and the touch electrode receiving a maximum value of received signal strength for each touch electrode for the second downlink signal are different from each other,
wherein the touch circuit for supplying an uplink signal and the pen receiving the uplink signal and outputting the downlink signal are performed during one or more touch driving periods in a driving timing,
wherein the one or more touch driving periods for touch driving and one or more display driving periods for display driving are alternately assigned in a time-division manner or independently defined in an independent manner, and
wherein, when the touch display device is driven in the time-division manner, the one or more touch driving periods are blank periods during which the display driving is not performed or when the touch display device is driven in the independent manner, the display driving and the touch driving are simultaneously performed.

* * * * *